(12) United States Patent
Line et al.

(10) Patent No.: US 11,027,633 B2
(45) Date of Patent: Jun. 8, 2021

(54) POWER HEAD RESTRAINT FLEXIBLE CLOSEOUT COVER

(71) Applicant: Ford Global Technologies, LLC, Dearborn, MI (US)

(72) Inventors: Johnathan Andrew Line, Northville, MI (US); Christian J. Hosbach, Taylor, MI (US); Carol Casey, Dearborn, MI (US); Marcos Silva Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/804,102

(22) Filed: Feb. 28, 2020

(65) Prior Publication Data

US 2020/0198510 A1 Jun. 25, 2020

Related U.S. Application Data

(62) Division of application No. 16/159,984, filed on Oct. 15, 2018, now Pat. No. 10,625,644, which is a division of application No. 15/139,483, filed on Apr. 27, 2016, now Pat. No. 10,144,321.

(51) Int. Cl.
| | |
|---|---|
| *B60N 2/58* | (2006.01) |
| *B60N 2/60* | (2006.01) |
| *B60N 2/865* | (2018.01) |
| *B60N 2/02* | (2006.01) |
| *B60N 2/80* | (2018.01) |

(52) U.S. Cl.
CPC ............. *B60N 2/58* (2013.01); *B60N 2/0232* (2013.01); *B60N 2/6009* (2013.01); *B60N 2/865* (2018.02); *B60N 2002/0236* (2013.01); *B60N 2002/899* (2018.02)

(58) Field of Classification Search
CPC ........ B60N 2/0232; B60N 2/58; B60N 2/865; B60N 2/6009; B60N 2002/0236; B60N 2002/899
See application file for complete search history.

(56) References Cited

U.S. PATENT DOCUMENTS

| | | |
|---|---|---|
| 4,533,174 A | 8/1985 | Fleishman |
| 4,856,848 A | 8/1989 | O'Sullivan et al. |
| 4,865,388 A | 9/1989 | Nemoto |

(Continued)

*Primary Examiner* — Philip F Gabler
(74) *Attorney, Agent, or Firm* — David Coppiellie; Price Heneveld LLP

(57) ABSTRACT

A vehicle seat includes a seatback having an upper portion. An adjustable headrest assembly is supported on the upper portion of the seatback. The adjustable headrest assembly has a headrest bun and an adjustment mechanism for adjusting the headrest bun between extended and retracted positions. A trim component is disposed on the upper portion of the seatback having a relief portion. The relief portion is configured to receive a portion of the adjustment mechanism as the headrest bun is driven towards the extended position. A flexible cover member is coupled to the trim component at the relief portion. The flexible cover member has a plate member operable between extend and retracted positions. The portion of the adjustment mechanism abuts an inner surface of the plate member to move the plate member towards the extended position as the headrest bun is driven towards the extended position.

7 Claims, 22 Drawing Sheets

(56) References Cited

U.S. PATENT DOCUMENTS

| | | | |
|---|---|---|---|
| 5,314,240 | A | 5/1994 | Ishi et al. |
| 5,465,998 | A | 11/1995 | Davis |
| 5,772,280 | A | 6/1998 | Masara |
| 6,378,942 | B1 | 4/2002 | Chu |
| 6,409,268 | B1 * | 6/2002 | Cvek .............. A47C 7/405 297/284.4 |
| 6,550,856 | B1 | 4/2003 | Ganser et al. |
| 7,073,863 | B1 | 7/2006 | Low et al. |
| 7,455,365 | B2 | 11/2008 | Caruso et al. |
| 7,588,115 | B2 | 9/2009 | Breed |
| 7,857,388 | B2 * | 12/2010 | Bedford .............. A47C 7/40 297/284.7 |
| 7,926,871 | B2 | 4/2011 | Meixner et al. |
| 8,752,894 | B2 | 6/2014 | Trimbom et al. |
| 10,144,321 | B2 * | 12/2018 | Line .............. B60N 2/6009 |
| 10,625,644 | B2 * | 4/2020 | Line .............. B60N 2/6009 |
| 2002/0060485 | A1 * | 5/2002 | Fischer .............. B60N 2/99 297/284.4 |
| 2005/0127734 | A1 | 6/2005 | Veine et al. |
| 2005/0253429 | A1 | 11/2005 | Veine et al. |
| 2009/0315372 | A1 | 12/2009 | Tracht |
| 2014/0077565 | A1 | 3/2014 | Baumgarten et al. |

* cited by examiner

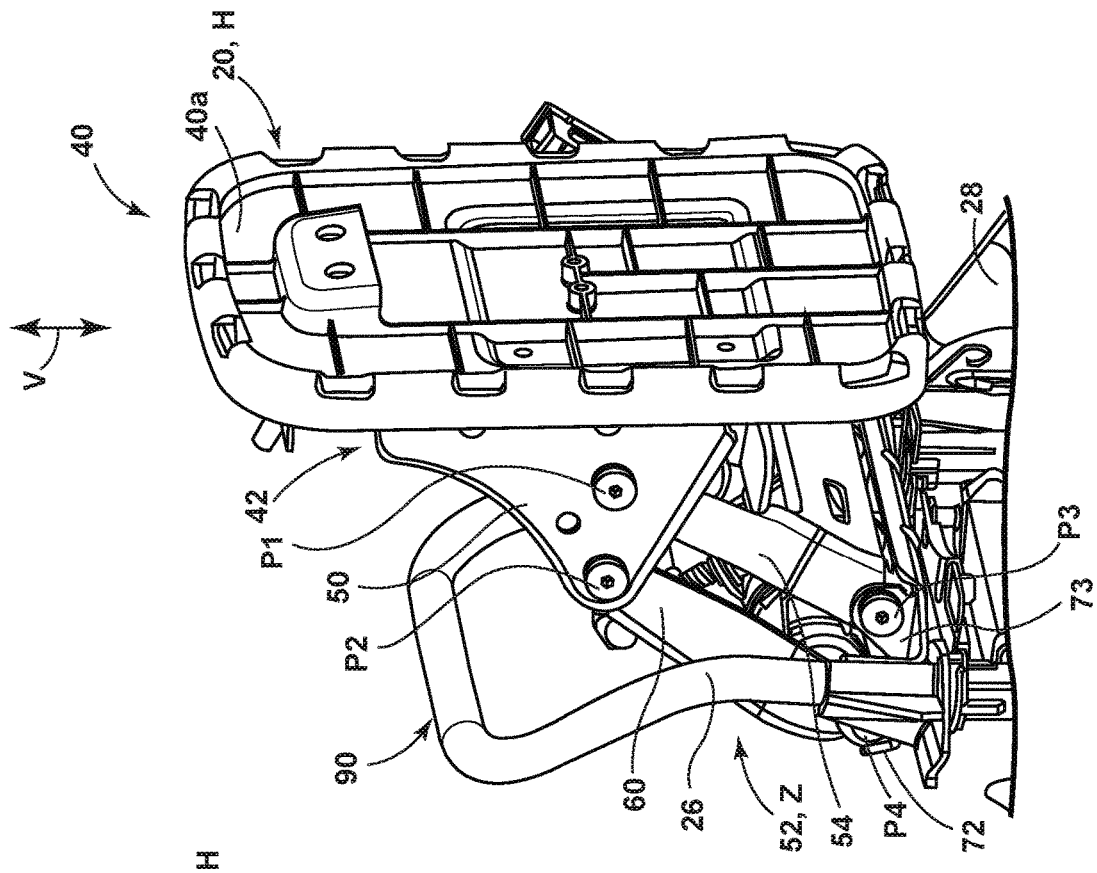
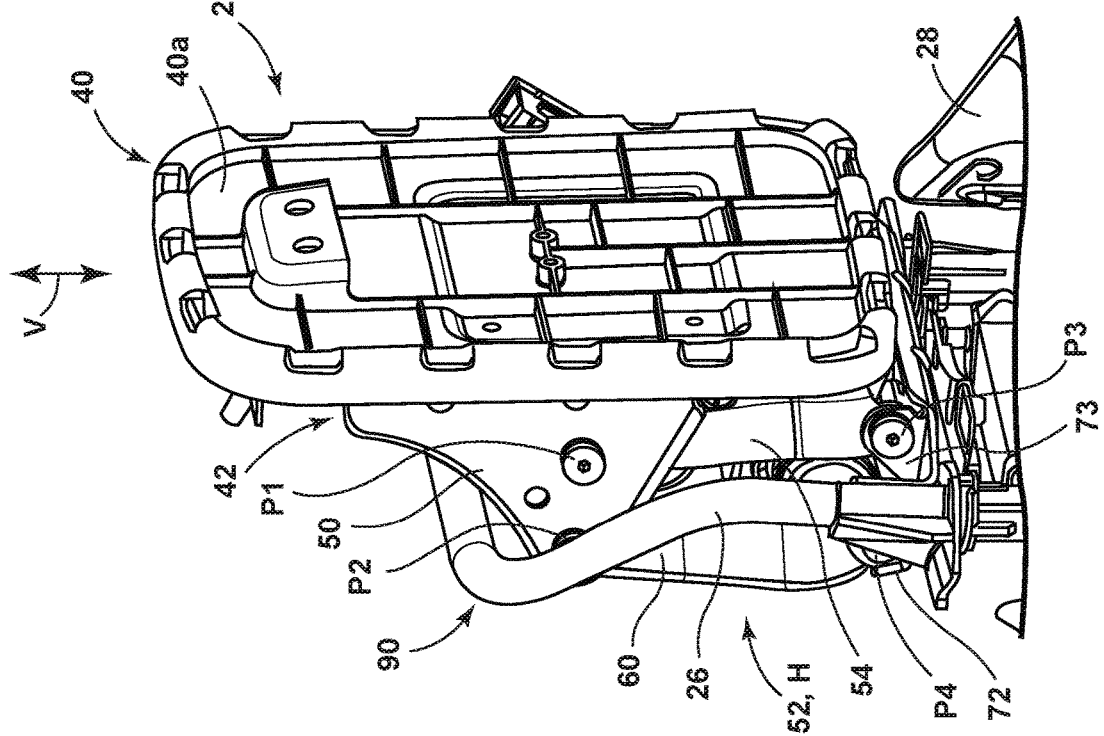

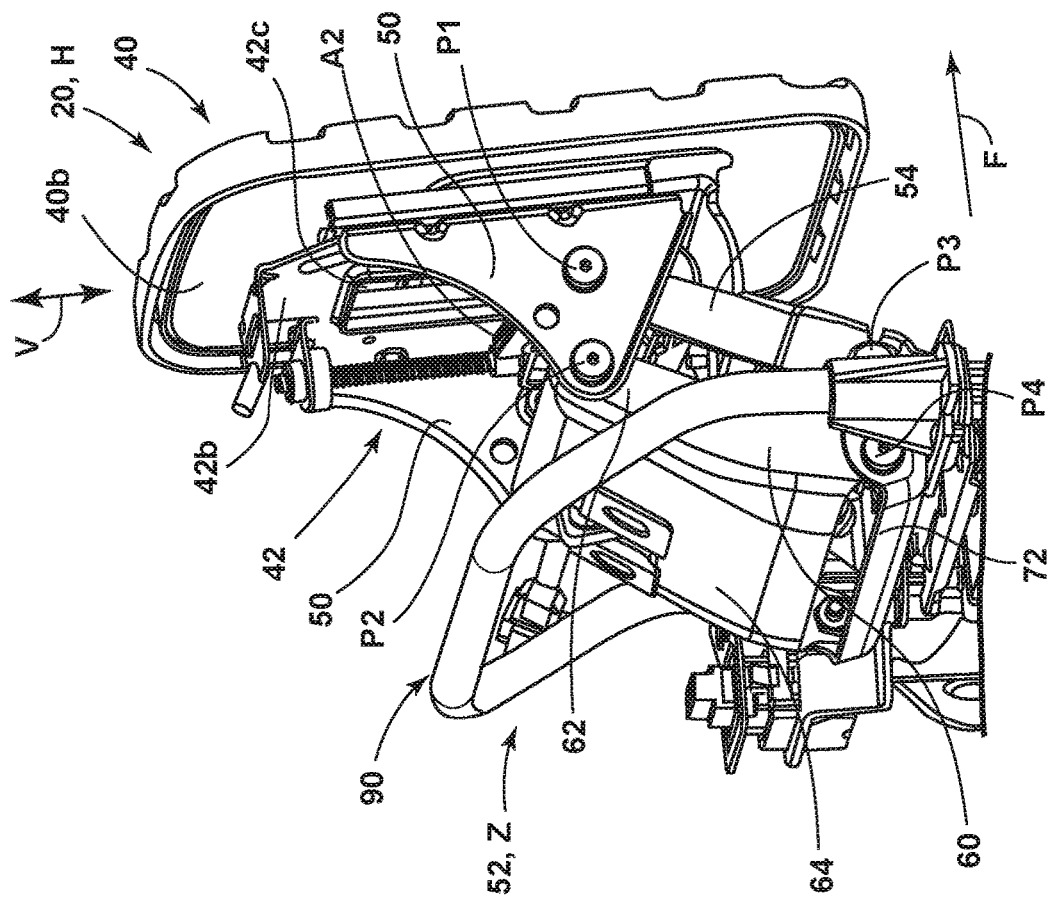
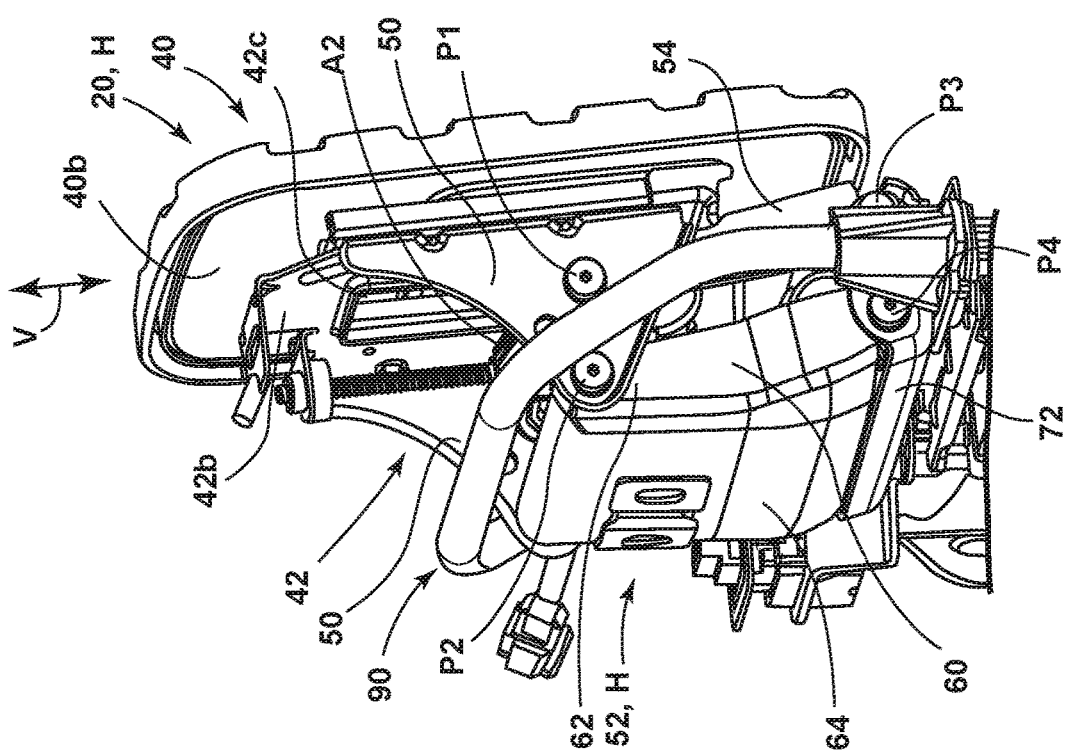

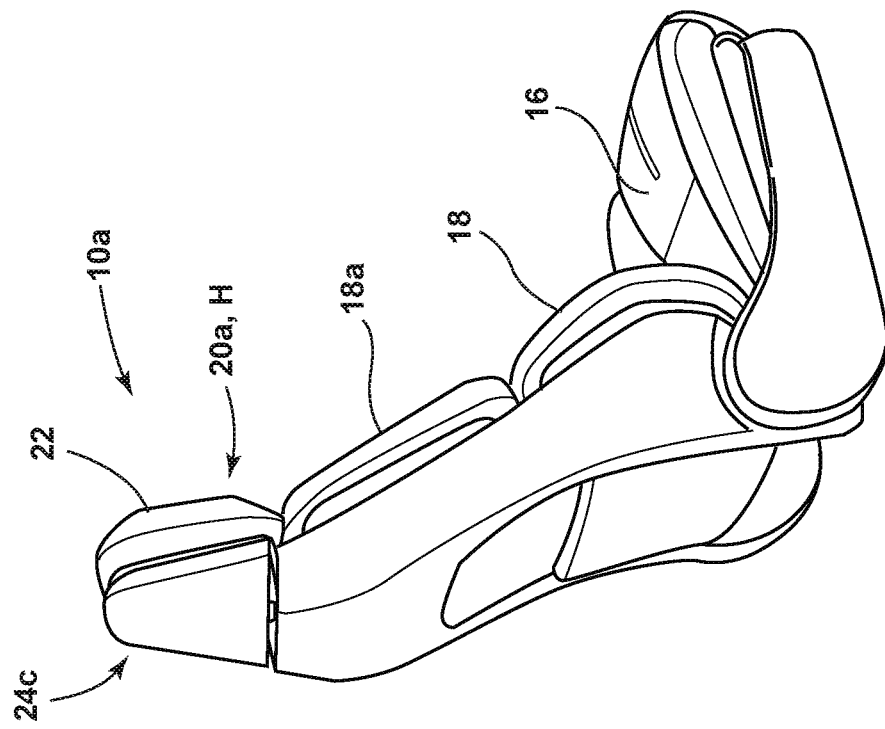
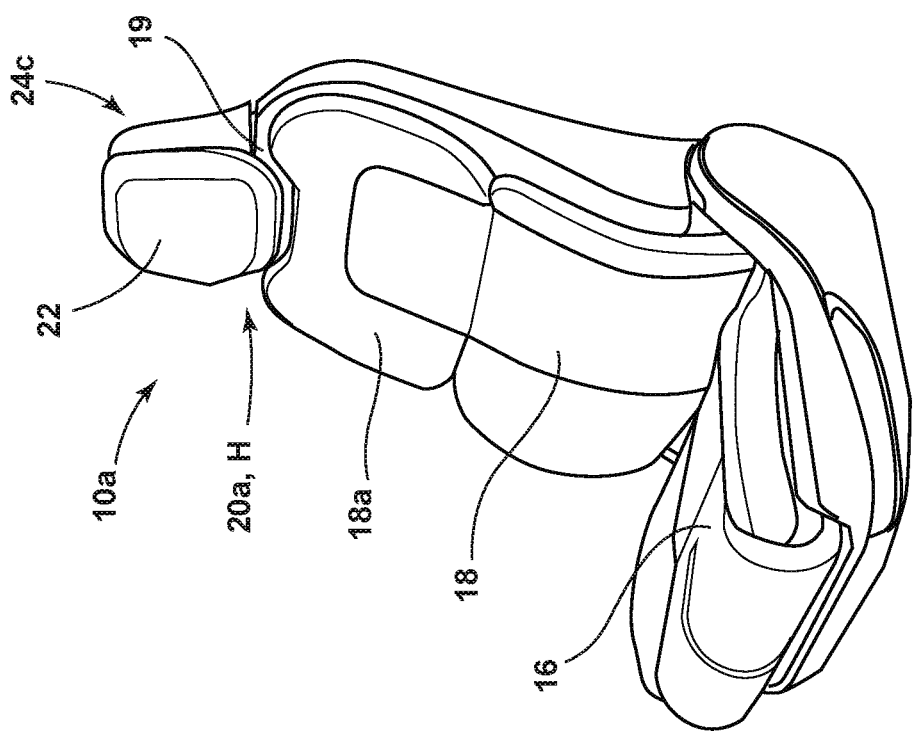

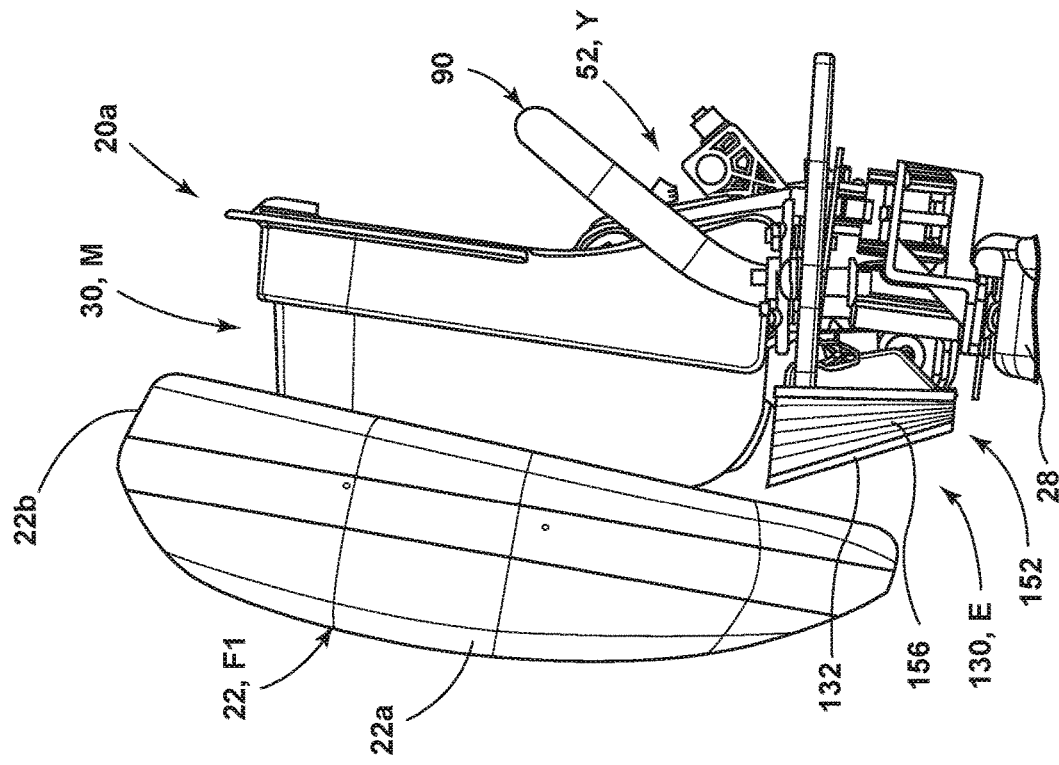
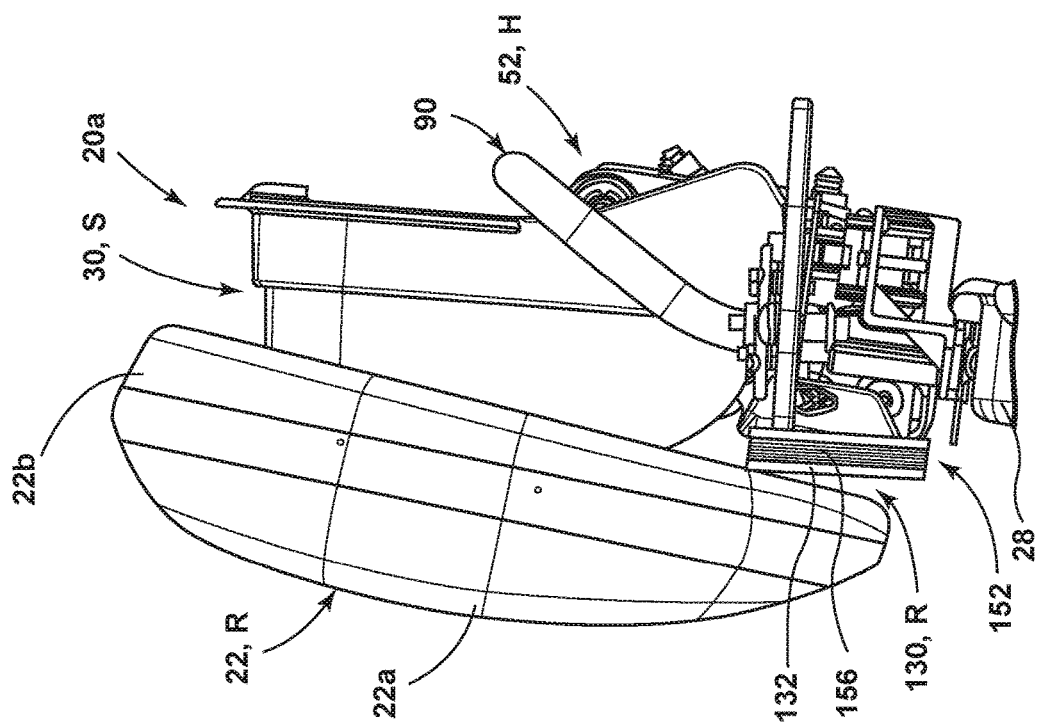

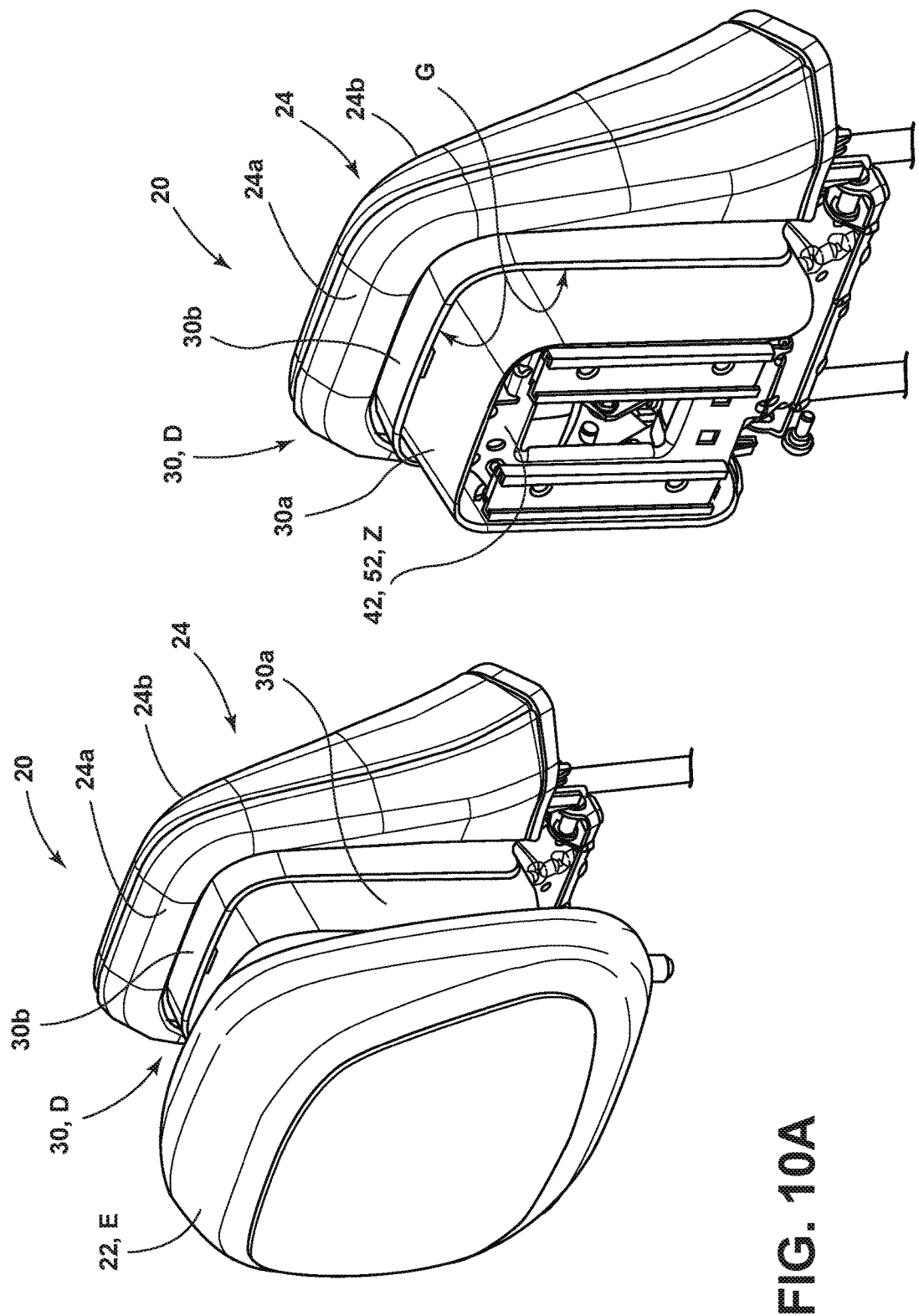

POWER HEAD RESTRAINT FLEXIBLE CLOSEOUT COVER

CROSS-REFERENCE TO RELATED APPLICATION

The present application is a divisional of U.S. patent application Ser. No. 16/159,984, filed on Oct. 15, 2018, now U.S. Pat. No. 10,144,321 entitled, POWER HEAD RESTRAINT FLEXIBLE CLOSEOUT COVER, which is a divisional of U.S. patent application Ser. No. 15/139,483, filed Apr. 27, 2016, now. U.S. Pat. No. 10,625,644 entitled, POWER HEAD RESTRAINT FLEXIBLE CLOSEOUT COVER, the entire disclosure of which is hereby incorporated herein by reference.

FIELD OF THE INVENTION

The present invention generally relates to a headrest assembly for a vehicle seat, and more particularly, to an adjustable headrest assembly having a flexible cover member configured to conceal components of the headrest assembly when adjusting the headrest assembly.

BACKGROUND OF THE INVENTION

In the automotive industry, a number of headrest designs are available that provide adjustment of a headrest to accommodate a variety of vehicle occupants in multiple positions. A headrest assembly that can provide adequate adjustment is desired in order to satisfy the needs of various vehicle occupants, and such a headrest should be aesthetically pleasing as well by providing a flexible cover member to conceal moving parts of the headrest assembly.

SUMMARY OF THE INVENTION

According to one aspect of the present invention, a vehicle seat includes a seatback having an upper portion. An adjustable headrest assembly is supported on the upper portion of the seatback. The adjustable headrest assembly has a headrest bun and an adjustment mechanism for adjusting the headrest bun between extended and retracted positions. A trim component is disposed on the upper portion of the seatback having a relief portion. The relief portion is configured to receive a portion of the adjustment mechanism as the headrest bun is driven towards the extended position. A flexible cover member is coupled to the trim component at the relief portion. The flexible cover member has a plate member operable between extend and retracted positions. The portion of the adjustment mechanism abuts an inner surface of the plate member to move the plate member towards the extended position as the headrest bun is driven towards the extended position.

According to another aspect of the present invention, a vehicle seat includes a seatback having an upper portion. A headrest assembly is coupled to the upper portion and has an adjustment mechanism for adjusting a position of a headrest bun. A flexible cover member is coupled to the upper portion and has a plate member engaged with the adjustment mechanism. The plate member is moved towards an extended position as the headrest bun is driven outwardly by the adjustment mechanism.

According to yet another aspect of the present invention, a vehicle seat includes a seatback which has an upper portion. A headrest assembly is coupled to the upper portion. A cover member is positioned below the headrest assembly which includes a generally U-shaped support frame and a plate member pivotally coupled to a lower portion of the support frame through a flexible joint. Ends of the plate member are coupled to side members of the support frame through flexible connectors.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is a front perspective view of a headrest assembly with a rear trim cover and headrest bun removed to reveal a linkage system in a retracted position;

FIG. 4B is a front perspective view of the headrest assembly of FIG. 4A with the linkage system in a fully extended position;

FIG. 4C is a rear perspective view of the headrest assembly of FIG. 4A;

FIG. 4D is a rear perspective view of the headrest assembly of FIG. 4B;

FIG. 6A is a front perspective view of a vehicle seat assembly according to another embodiment of the present invention;

FIG. 6B is a rear perspective view of the vehicle seat of FIG. 6A;

FIG. 9A is a side elevational view of a headrest assembly having the cover plate of FIG. 7A disposed thereon in a retracted position;

FIG. 9B is a side elevational view of the headrest assembly of FIG. 9A shown in an extended position, with the cover plate also in an extended position;

FIG. 10A is a front perspective view of a headrest assembly with a headrest bun in a fully extended position.

FIG. 10B is a front perspective view of the headrest assembly of FIG. 10A with the headrest bun removed;

DETAILED DESCRIPTION OF THE PREFERRED EMBODIMENTS

Figure 1:
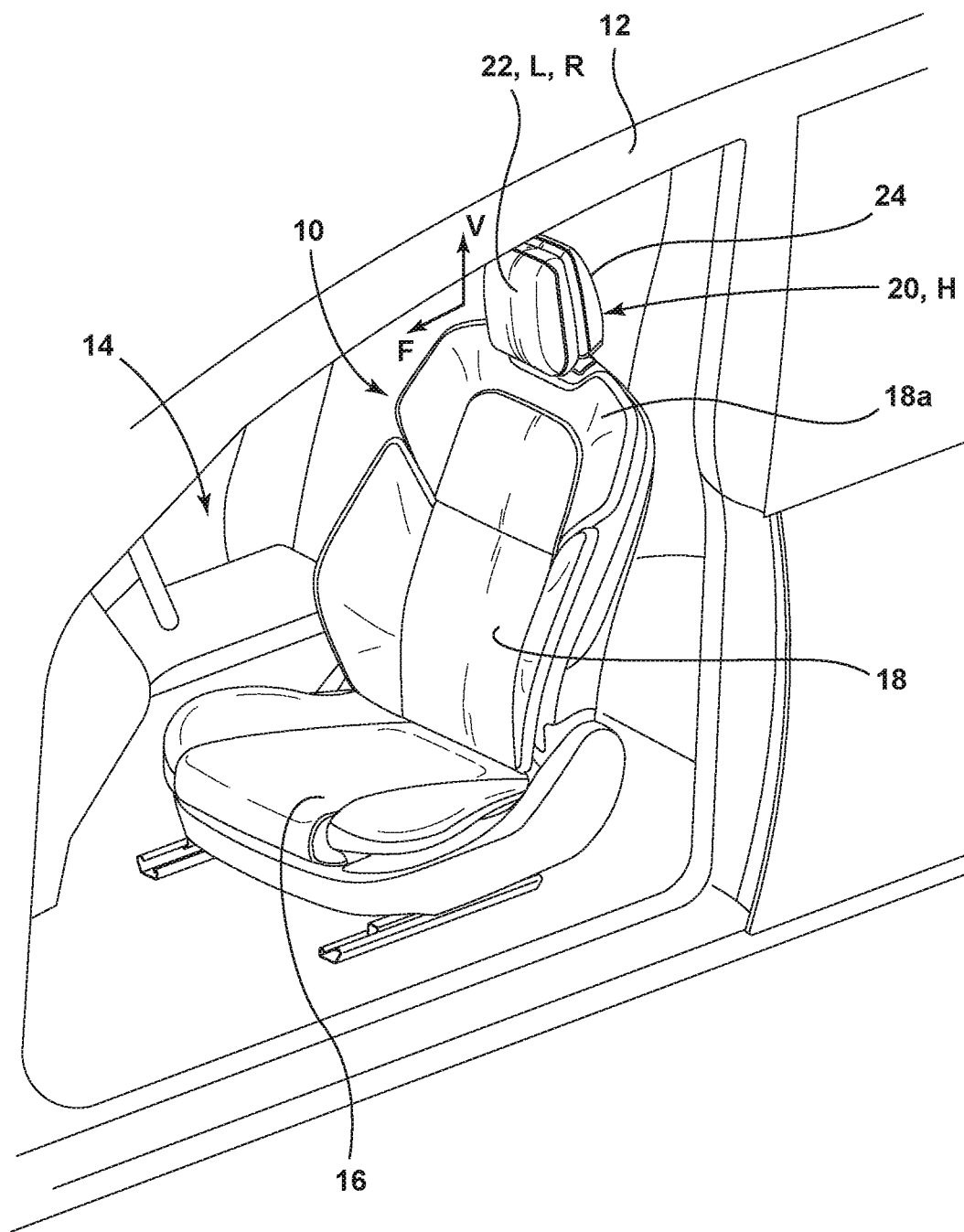
FIG. 1 is a front perspective view of a vehicle seat having a headrest assembly as disposed in a vehicle interior.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle seat 10 is shown disposed within a vehicle interior 14 of a vehicle 12. The vehicle seat 10 includes a seat portion 16 which is coupled to a seatback 18. The seatback 18 includes an upper portion 18a having a headrest assembly 20 mounted thereon. The headrest assembly 20 includes a housing 24 that is a rear housing disposed adjacent to an adjustable headrest bun 22. The headrest bun 22 is contemplated to be a cushioned member configured to support the head of a vehicle occupant seated in the vehicle seat 10. The vehicle seat 10 of FIG. 1 is shown as a driver's side vehicle seat, however, it is contemplated that the headrest assembly 20 of the present invention may be disposed on any vehicle seat within a vehicle, including passenger seats, rear seats, folding seats and third row passenger seat options. As such, the headrest assembly 20 shown in FIG. 1 is not intended to limit the spirit of the invention as shown on a front driver's side vehicle seat 10.

As noted above, the headrest assembly 20 is an adjustable headrest assembly, wherein the headrest bun 22 is contemplated to be adjustable in a forward direction, as indicated by arrow F between extended and retracted positions, as well as a vertical direction, as indicated by arrow V, between raised and lowered positions, relative to the housing 24. In the position shown in FIG. 1, the headrest assembly 20 is contemplated to be in a home position H which correlates to the headrest bun 22 being in the lowered vertical position L and the retraced horizontal position R, such that the headrest bun 22 is disposed directly in front of the housing 24. Movement of the headrest bun 22 is contemplated to be powered by one or more powered adjustment mechanisms that are substantially concealed by the housing 24 when the headrest assembly 20 is in the home position H.

Figure 2B:
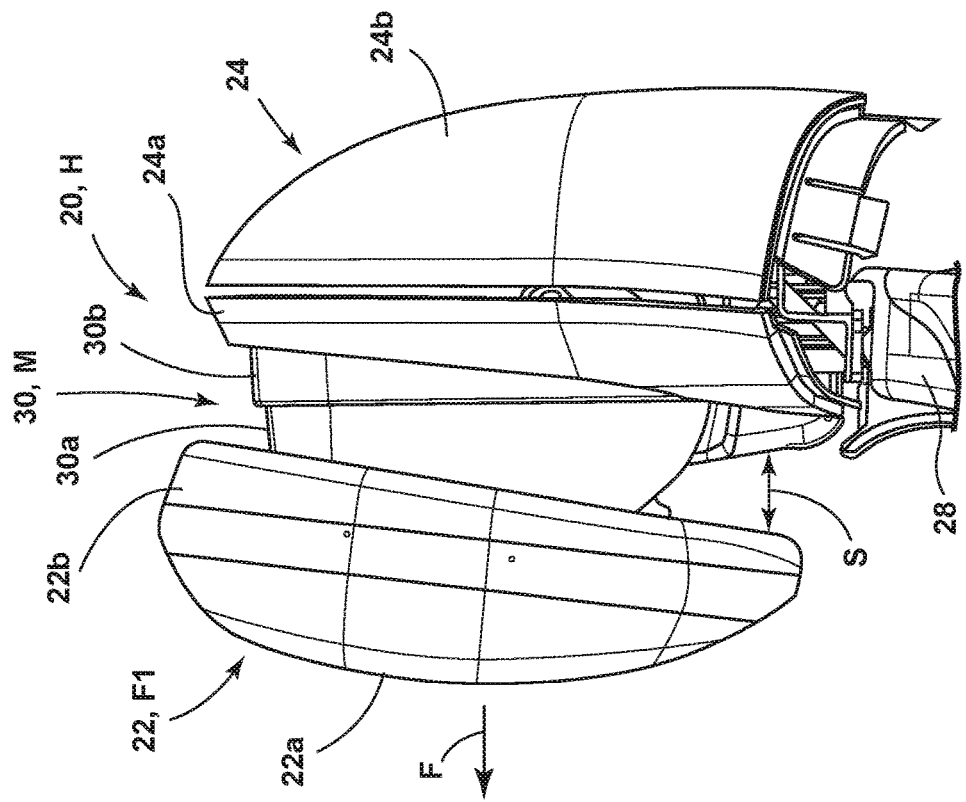
FIG. 2B is a side elevational view of the headrest of FIG. 2A with the headrest bun in a forward position relative to FIG. 2A, thereby revealing an adjustable cover assembly.
Figure 2A:
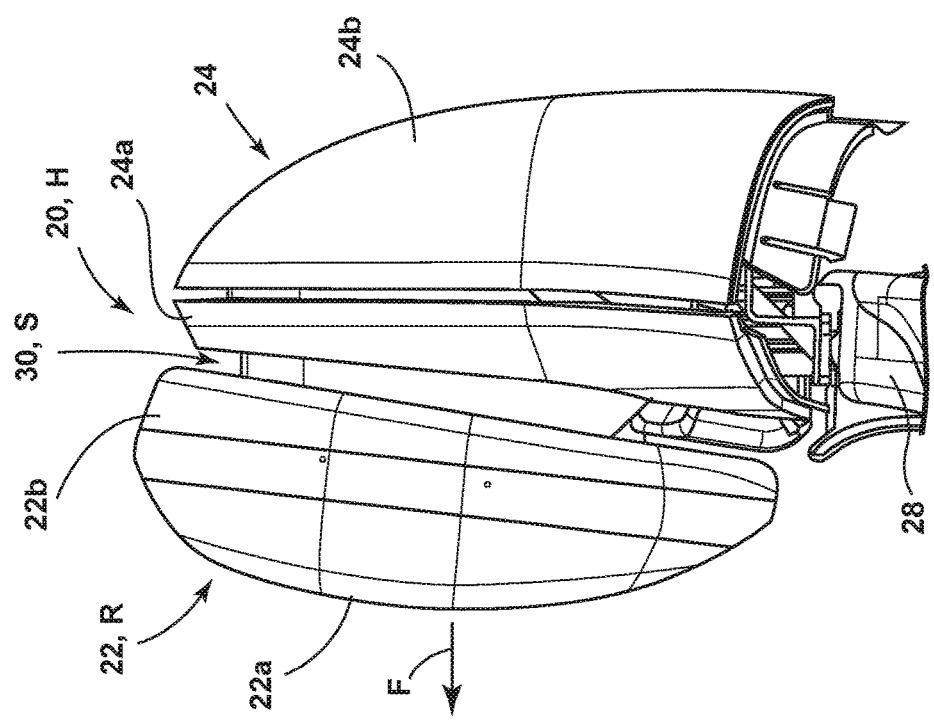
FIG. 2A is a side elevational view of a headrest assembly according to an embodiment of the present invention, wherein a headrest bun of the headrest assembly is in a retracted position.
Figure 2C:
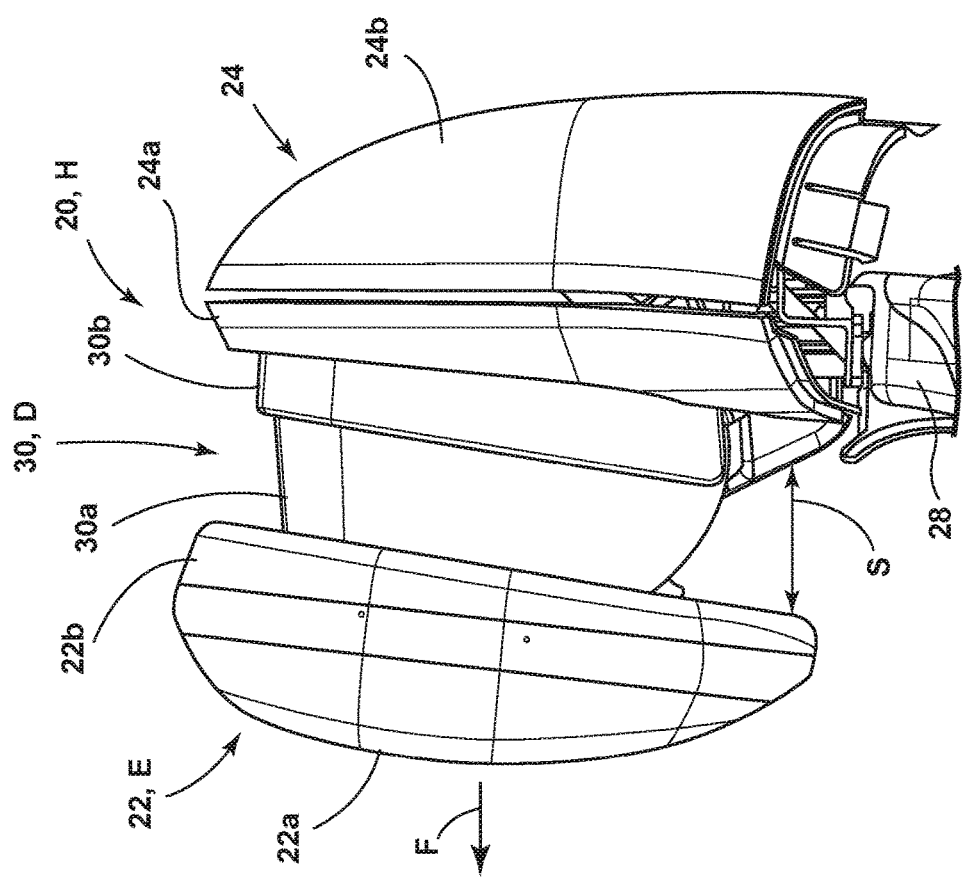
FIG. 2C is a side elevational view of the headrest of FIG. 2B showing the headrest bun in a full forward position.

Referring now to FIG. 2A, the headrest assembly 20 is shown in the home position H with the headrest bun 22 in the retracted position R relative to the housing 24. The headrest assembly 20 is supported from and mounted to a seatback frame 28 that is generally positioned within the seatback 18 (FIG. 1) in assembly. The headrest bun 22 is shown as a two-piece member having a cushioned front portion 22a, for engagement (or abutting support) by a user, and a rear coupling portion 22b. The housing 24 is also a two-piece member having a front shroud 24a and rear shroud 24b which are used to surround and conceal various adjustment mechanisms and systems used to adjust a position of the headrest bun 22. As further shown in FIG. 2A, an adjustable cover assembly 30 is disposed in a stowed position S, and is configured to cover an area between the headrest bun 22 and the housing 24, as further described below. The adjustable cover assembly 30, as further shown in FIGS. 2B and 2C, is better revealed as the headrest bun 22 moves forward in a direction as indicated by arrow F relative to the housing 24. The adjustable cover assembly 30 is contemplated to be a plastic injection molded multi-part assembly that is configured to substantially conceal various adjustment mechanisms and systems of the headrest assembly 20 as the headrest bun 22 is adjusted horizontally relative to the housing 24.

Referring now to FIG. 2B, the headrest bun 22 is shown in a forward position F1, wherein the headrest bun 22 has moved in a car-forward direction along the path indicated by arrow F with respect to the housing 24. Thus, as shown in FIG. 2B, the coupling portion 22b of headrest bun 22 is shown spaced away from the front shroud 24a of the housing 24 to define a spacing S therebetween. With the spacing S between the coupling portion 22b of the headrest bun 22 and the front shroud 24a of the housing 24, the adjustable cover assembly 30 can be seen having two gap-hiding members, a first member 30a and a second member 30b, which together conceal adjustment components of the headrest assembly 20 over the spacing S. It is contemplated that the first member 30a can nest within the second member 30b, or vice versa, such that the adjustable cover assembly 30 can telescopingly extend in a seemingly horizontal manner as the headrest bun 22 is driven away from the housing 24 in the forward direction as indicated by arrow F. In the embodiment shown in FIG. 2B, the adjustable cover assembly 30 is in a mid-position M, wherein the first member 30a is partially received in the second member 30b of the adjustable cover assembly 30. Further, the first member 30a is contemplated to be fully retracted and partially received in a nested position within the second member 30b of the adjustable cover assembly 30 when the headrest bun 22 is in the retracted position R (FIG. 2A). Thus, the first member 30a and the second member 30b can also be referred to as inner and outer members or gap-hiders given the nesting or telescoping relationship of the two components.

The adjustable cover assembly 30 is coupled to a linkage system 52 (FIG. 3A) that acts as a carrier for the headrest bun 22 that is also coupled to the linkage system 52. Engagement between the first member 30a of the adjustable cover assembly 30 and the linkage system 52 is further described below with reference to FIG. 12. The adjustable cover assembly 30 is further coupled to the housing 24 by a kinetic engagement between the second member 30b of the adjustable cover assembly 30 and the front shroud 24a of the housing 24. The housing 24 is a stationary assembly that is coupled to and supported by the seatback frame 28. Thus, as the headrest bun 22 moves horizontally in the direction as indicated by arrow F, the adjustable cover assembly 30 follows the headrest bun 22 on the linkage system 52 and extends in a telescoping-like manner, as further described below. In this way, the adjustable cover assembly 30 is a slave to the movement of the linkage system 52 and headrest bun 22, and only extends or retracts as a condition of the movement of the linkage system 52. Thus, the adjustable cover assembly 30 acts as a two-piece gap hider for the headrest assembly 20 by concealing adjustment components that would otherwise be revealed in the spacing S between the headrest bun 22 and the housing 24 as the headrest bun 22 extends outwardly towards the extended position E (FIG. 2C).

Referring now to FIG. 2C, the headrest bun 22 of the headrest assembly 20 is shown in the extended position E, which is contemplated to be a full extension of the headrest bun 22 in the direction as indicated by arrow F relative to the housing 24. In FIG. 2C, the first member 30a of the adjustable cover assembly 30 is more clearly shown given the increased spacing S between the coupling portion 22b of the headrest bun 22 and the front shroud 24a of the housing 24. In FIG. 2C, the first member 30a is in an outwardly extended position relative to the second member 30b, such that the first member 30a is no longer nested with the second member 30b. Thus, in FIG. 2C, relative to FIG. 2A, the adjustable cover assembly 30 has moved from a stowed position S to a deployed position D due to the linkage system 52 driving headrest bun 22 to the extended position E from the retracted position R. As shown in FIG. 2C, the headrest assembly 20 of the present invention provides a large range of extension of the headrest bun 22 in a forward direction F relative to the housing 24, thereby providing enhanced comfort for a vehicle occupant. As further shown in FIG. 2C, while the headrest bun 22 is in the forward most position E, the adjustment mechanisms of the headrest assembly 20, that provide for this horizontal extension, are substantially concealed by the adjustable cover assembly 30 and the housing 24. With the adjustment mechanisms concealed, the headrest assembly 20 of the present invention provides for a more pleasing aesthetic relative to adjustable headrest assemblies known in the marketplace. Thus, the adjustable cover assembly 30 is operable between stowed and deployed positions S, D (FIGS. 2A and 2C, respectively) depending on the extended position of the linkage system 52 and the headrest bun 22. It is contemplated that the headrest bun 22 can move forward relative to the housing 24 about 50 mm to the extended position E from retracted position R. Other ranges of forward movement are also contemplated.

Figure 3A:
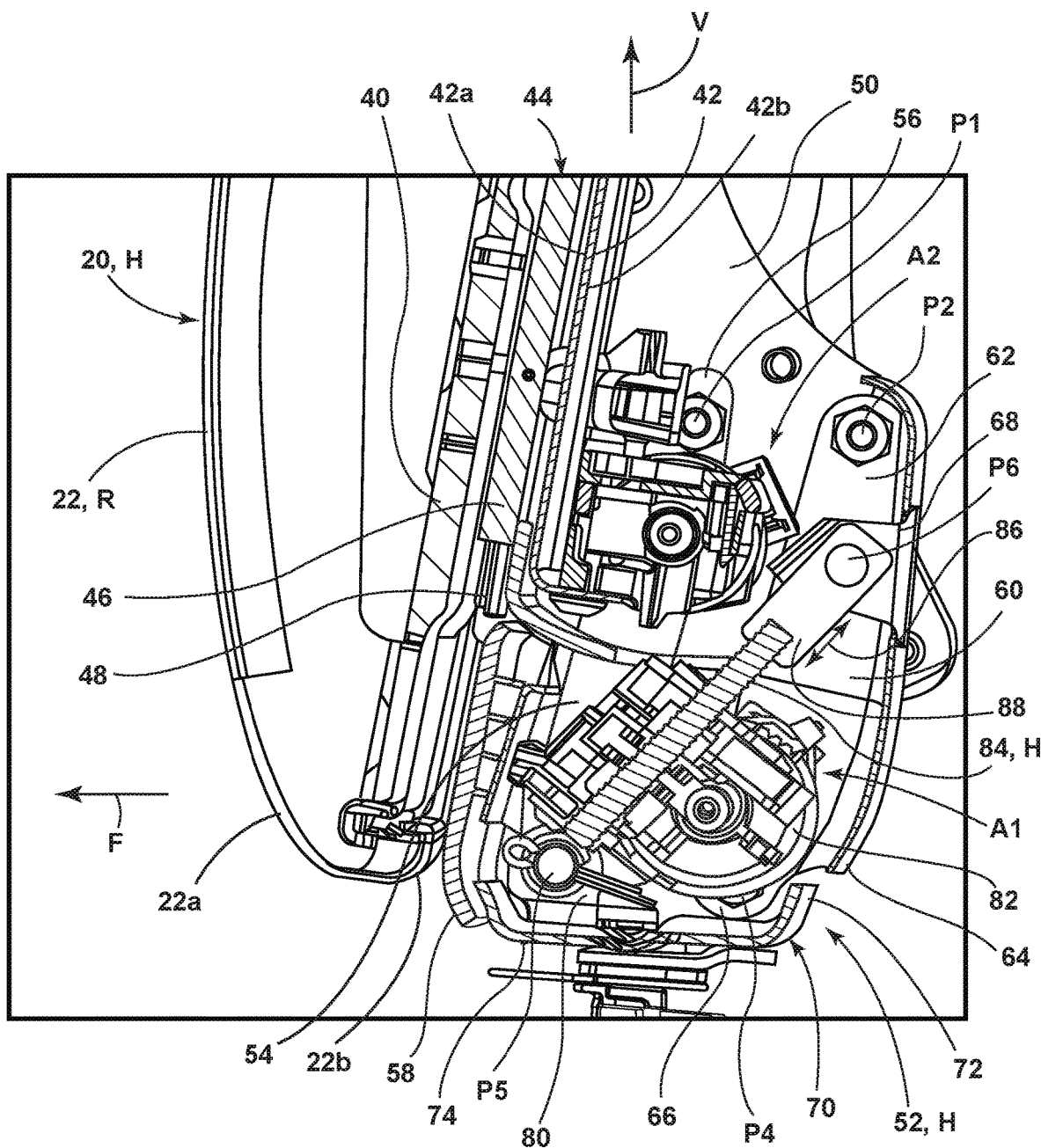
FIG. 3A is a cross-sectional view of the headrest assembly showing an adjustment mechanism for adjusting the headrest bun.

Referring now to FIG. 3A, a cross-section of the headrest assembly 20 is shown in the home position H with the housing 24 removed to reveal the adjustment mechanisms configured to power movement of the headrest bun 22 between the extended and retracted positions E, R (FIGS. 2C, 2A, respectively). The headrest bun 22 is shown coupled to a support plate 40 which is adjustably coupled to a mounting plate 42 disposed within the housing 24 in the configuration of FIG. 3A. The headrest bun 22 is vertically adjustable along the path as indicated by arrow V by a channel and rail arrangement 44 disposed between the support plate 40 and mounting plate 42. The channel and rail arrangement 44 between the headrest bun 22 and the mounting plate 42 is contemplated to be an arrangement utilizing multiple channels and multiple rails received therein. As shown in FIG. 3A, a channel 46 is coupled to the mounting plate 42 on a front side 42a of the mounting plate 42, and configured to slideably receive a rail 48 therein. The rail 48 is coupled to the support plate 40. Vertical movement of the headrest bun 22 is contemplated to be powered by an adjustment mechanism, shown in the form of a linear actuator A2.

As further shown in FIG. 3A, the mounting plate 42 further includes a rear side 42b having outwardly extending brackets 50. The brackets 50 are contemplated to be twin brackets which rearwardly extend from the rear side 42b of the mounting plate 42 as best shown in FIGS. 4C and 4D. The brackets 50 serve as a pivoting attachment location for the linkage system 52. Given the cross-sectional view of FIG. 3A, only a portion of the linkage system 52 is shown, however, it is contemplated that the linkage system 52 will be understood by one of ordinary skill in the art as shown in FIG. 3A, and better shown in FIGS. 4A-4D as further described below. The linkage system 52 may be a four bar linkage system having various sized links. One or more links may have multiple pivoting locations to provide a multiple link system operating as a reinforced four bar linkage between fore and aft positions. The linkage system 52 is contemplated to translate the headrest bun 22 between an extended position E, as shown in FIG. 2C, and a retracted position R, as shown in FIGS. 2A and 3A. The linkage system 52 is comprised of a plurality of links which are rigid members pivotally connected to one another as further described below.

As further shown in FIG. 3A, the linkage system 52 includes a front or first link 54, which may be described as an output link, having an upper portion 56 which is pivotally coupled to a bracket 50 of mounting plate 42 at pivot point P1. The first link 54 is contemplated to be one of a pair of front links which are interconnected by a cross member 58 to form a unitary front link assembly. A second or rear link 60, which may be described as an input link, is further shown in FIG. 3A having an upper portion 62 which is pivotally coupled to bracket 50 of the mounting plate 42 at pivot point P2. Much like the first link 54, the second link 60 is contemplated to be one of a pair of rear links which are interconnected by a cross member 64. Cross member 64 is shown in FIG. 3A in the form of a plate connecting the rear links 60 of the linkage system 52 to define a unitary rear link assembly. Thus, the mounting plate 42 and the brackets 50 act as a coupler for the output link (first link 54) and input link (second link 60) in the linkage system 52. The linkage system 52 is configured to guide the movement of the headrest bun 22 from the retracted position R to a range of forward positions disposed along the path as indicated by arrow F. The movement of the headrest bun 22 between extended and retracted positions along the path as indicated by arrow F is powered by an adjustment mechanism shown in the form of a linear actuator A1, which is configured to drive the linkage system 52 between fore and aft positions. The first link 54 and the second link 60 are further pivotally coupled to a base plate 70 at pivot points P3, P4, respectively. Pivot point P3 is better shown in FIGS. 4A and 4B. The base plate 70, which can be described as a ground link, is contemplated to extend in a substantially horizontal manner between the pairs of first and second links 54, 60. In FIG. 3A, a lower portion 66 of second link 60 is shown as coupled to a first side 72 of the base plate 70 at pivot point P4, better shown in FIG. 3C. As noted above, the first link 54, second link 60, and base plate 70 all define links of the linkage system 52 that are rigid members pivotally coupled to one another.

As further shown in FIG. 3A, the first actuator A1 is coupled to a bracket 80 which is further coupled to a bottom wall 74 of the base plate 70. The bracket 80 is contemplated to be a connecting bracket which pivotally couples the first actuator A1 at a pivot point P5 that is driven by, yet independent of, the linkage system 52. The first actuator A1 includes a motor 82 which is operably coupled to a spindle or threaded member 84. The threaded member 84 is configured to be driven by the motor 82 in a direction as indicated by arrow 86, such that first actuator A1 is a linear actuator. A connecting tab 88 is disposed on an upper portion of the threaded member 84 and is pivotally connected to a connecting bracket 68 extending outwardly from the cross member 64 of the second link 60 at pivot point P6. With the headrest bun 22 in the retracted position R, the first actuator A1 is configured to drive the threaded member 84 downward in the direction as indicated by arrow 86 using the motor 82 which is threadingly engaged with the threaded member 84 to extend the headrest bun 22. In this way, the first actuator A1 is configured to drive the headrest bun 22 forward as indicated by arrow F by drawing the linkage system 52 downward and forward. As the threaded member 84 is driven downward in a direction as indicated by arrow 86, the coupling of the connecting tab 88 to connecting bracket 68 of the second link 60 draws the second link 60 downward to drive the four bar linkage system 52 in the forward and downward direction, as further shown in FIGS. 3B-3D. The base plate 70 of the linkage system 52 is contemplated to be a stationary base plate that is pivotally connected to the first and second links 54, 60 at pivot points P3 and P4. With the upwardly extending connecting bracket 80 providing an independent pivoting location P5 for the first actuator A1, the first actuator A1 has a stand-alone pivot location relative to the linkage system 52. In this way, the first actuator A1 can pivot as necessary, in an independent manner relative to the linkage system 52, as the linkage system 52 translates forward and back as the position of the headrest bun 22 is adjusted by a user.

Figure 3B:
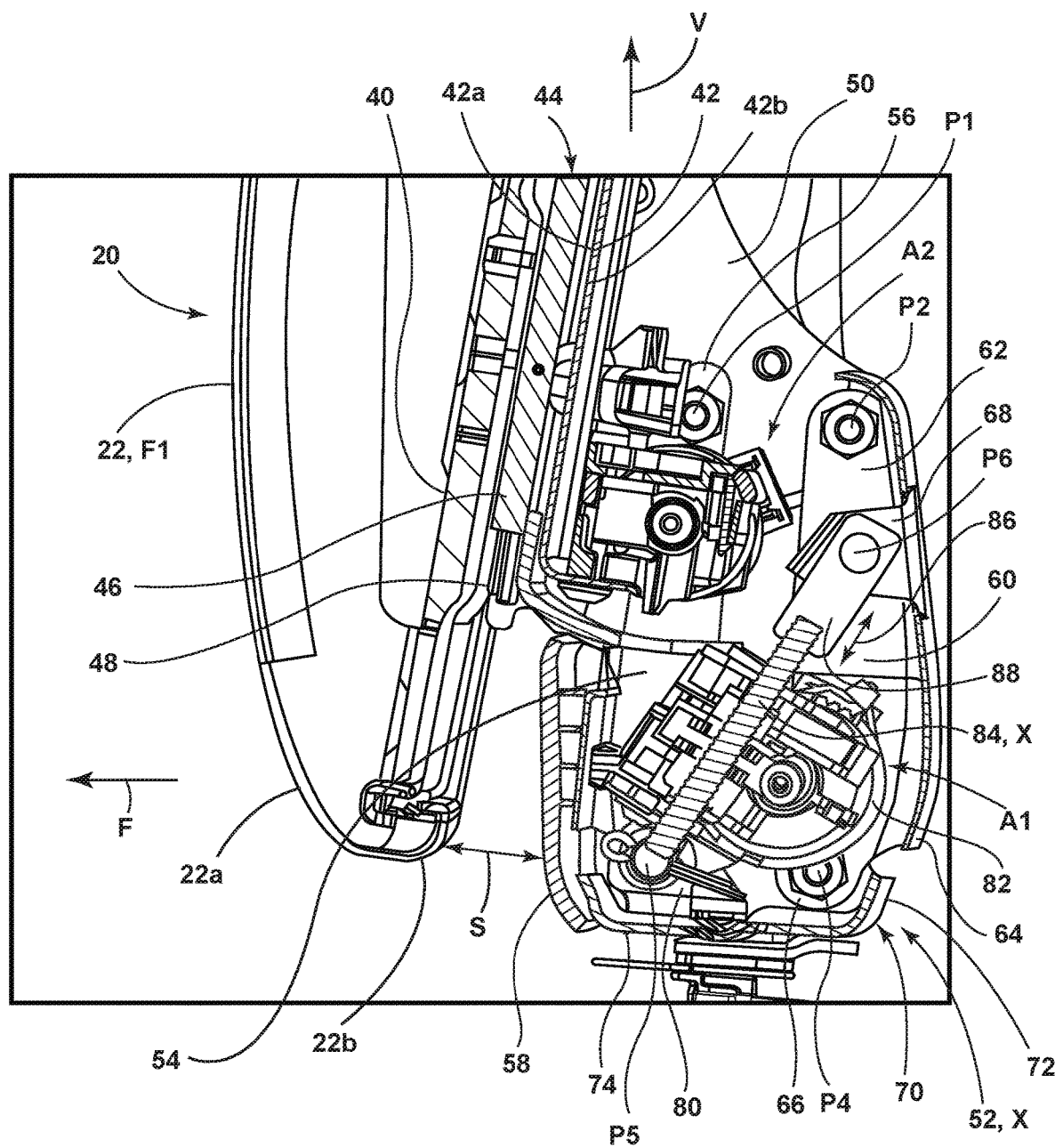
FIG. 3B is a cross-sectional view of the headrest assembly of FIG. 3A with the headrest bun in a forward position relative to FIG. 3A.

Referring now to FIG. 3B, the headrest bun 22 is shown in a forward position F1 which is similar to position F1 shown in FIG. 2B. Thus, the spacing S can now be seen between the headrest bun 22 and cross member 58 of the first link 54. In FIG. 3B, the threaded member 84 has been driven by the motor 82 of the first actuator A1 in a downward direction as indicated by arrow 86 to a position X. In this way, the linkage system 52 has been driven by the first actuator A1 to a forward position X from the home position H shown in FIG. 3A. In moving the headrest bun 22 to the forward position F1, the threaded member 84 moves from the home position H (FIG. 3A) to the position X shown in FIG. 3B. Similarly, the linkage system 52 moves from the home position H shown in FIG. 3A to the translated position X shown in FIG. 3B. It is contemplated that forward position F1 of the headrest bun 22 as shown in FIG. 3B is approximately one-third of the forward range of movement of the headrest bun 22 of the present concept.

Figure 3C:
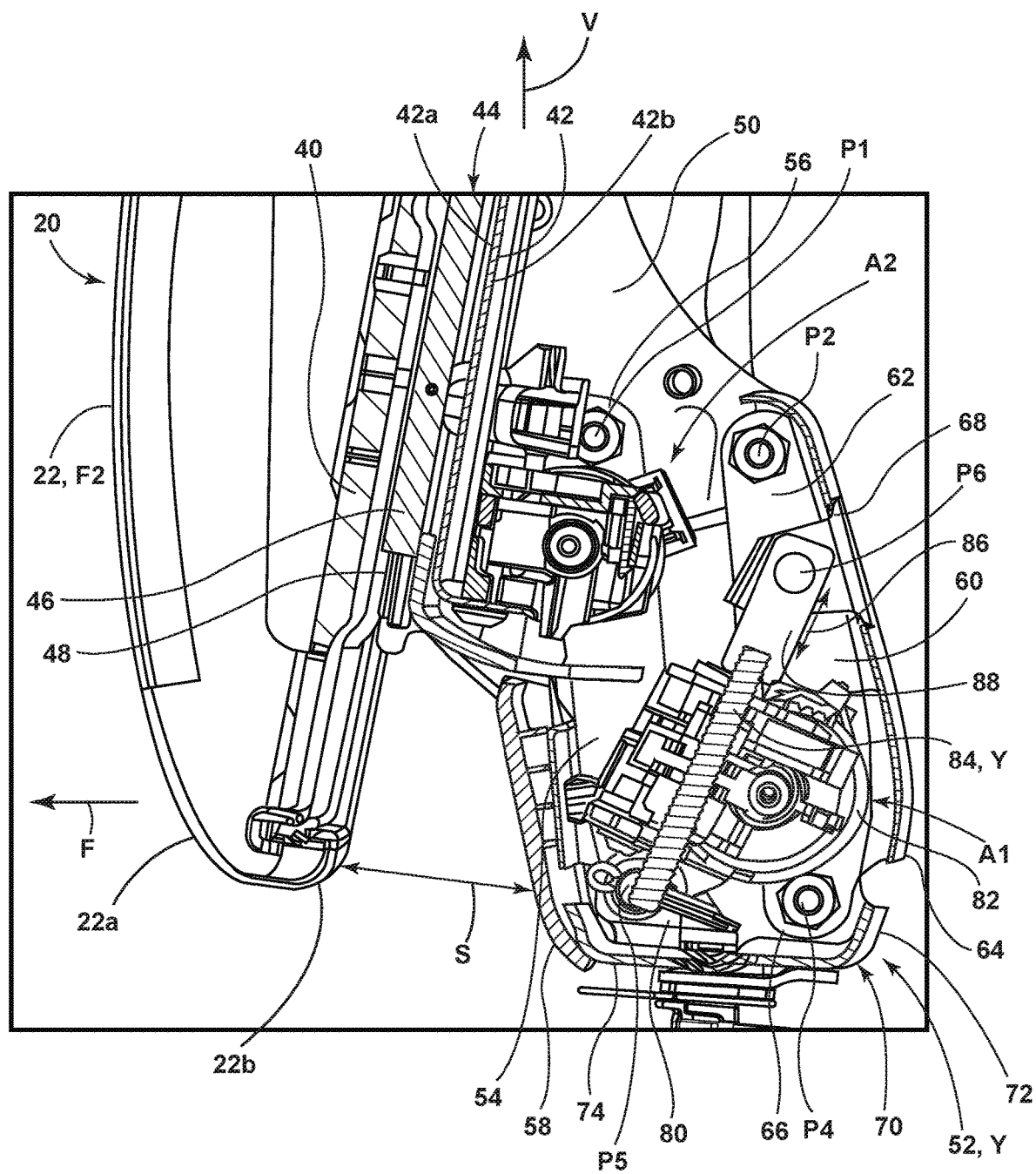
FIG. 3C is a cross-sectional view of the headrest assembly of FIG. 3B with the headrest bun in a forward position relative to FIG. 3B.

Referring now to FIG. 3C, the headrest bun 22 is shown in an intermediate position F2 that is forward of position F1 shown in FIG. 3B. In FIG. 3C, the threaded member 84 has been driven by the motor 82 of actuator A1 to a position Y which correlates to the linkage system 52 being translated to a forward position Y, thereby providing the increased spacing S shown in FIG. 3C relative to FIG. 3B. In the intermediate position F2, the headrest bun 22 is contemplated to be approximately two-thirds forward with respect to the full range of motion of the headrest bun 22 as driven by the linkage system 52.

Referring now to FIG. 4A, the linkage system 52 of the headrest assembly 20 is shown with the housing 24 and the headrest bun 22 removed from the headrest assembly 20. In FIG. 4A, the linkage system 52 is in the home position or aft position H which represents a recessed or retracted position, wherein the headrest bun 22 would be disposed directly adjacent to the housing 24, as shown in FIG. 2A, and the linkage system 52 would be substantially concealed by and housed within the housing 24 (FIG. 2A). As further shown in FIG. 4A, the mounting plate 42 is coupled to the support plate 40 and includes rearwardly extending dual brackets 50 having pivot points P1, P2 for pivotally coupling the first link 54 and second link 60. The second link 60 is shown pivotally coupled to the base plate 72 at pivot point P4 and the first link 54 is shown pivotally coupled to the base plate 72 at pivot point P3 disposed on a mounting bracket 73 extending upward from the base plate 72. A support structure 90 is shown having support rods 26 extending therefrom for coupling the headrest assembly 20 to seatback frame member 28.

Referring now to FIG. 4B, the linkage system 52 is shown in the fully extended fore position Z, wherein the support plate 40 is fully extended away from the support structure 90. In the fully extended position Z, the linkage system 52 reveals cross member 58 which interconnects twin pairs of the first links 54 as described above. The mounting plate 42, the first and second links 54, 60, and the base plate 72 are contemplated to be unitary parts which are rigid members that are pivotally connected to one another at pivot points (P1-P4) to provide extension of the support plate 40 between retracted and extended positions. In the position shown in FIG. 4B, the support plate 40 correlates to the headrest bun 22 being in the fully extended position E as shown in FIG. 2C. In the fully extended or fore position Z, the linkage system 52 is concealed by a combination of the adjustable cover assembly 30 and the housing 24, as shown in FIG. 2C.

Referring now to FIG. 4C, the headrest assembly 20 is shown with the linkage system 52 in the aft position H as similarly shown in FIG. 4A. The second link 60 is shown as a unitary plate, wherein the dual second links 60 are interconnected by cross member 64. In FIG. 4C, the mounting plate 42 is shown having dual brackets 50 extending rearwardly therefrom for pivotally connecting the first and second links 54, 60 at pivot points P1, P2.

Referring now to FIG. 4D, the linkage system 52 is in the fully extended fore position Z with the support plate 40 in the lowered position. FIG. 4D is a rear view of the headrest assembly 20 as shown in FIG. 4B. In FIGS. 4C and 4D, the second actuator A2 is shown coupled to the mounting plate 42 for vertical movement of the support plate 40 in the direction as indicated by arrow V. As shown in FIG. 4D, the second actuator A2 is operably coupled to the support plate 40 through an access aperture 42c disposed through the mounting plate 42. Thus, access aperture 42c is contemplated to be of sufficient vertical length to accommodate full vertical movement of the headrest bun 22.

Figures 5A, 5B:
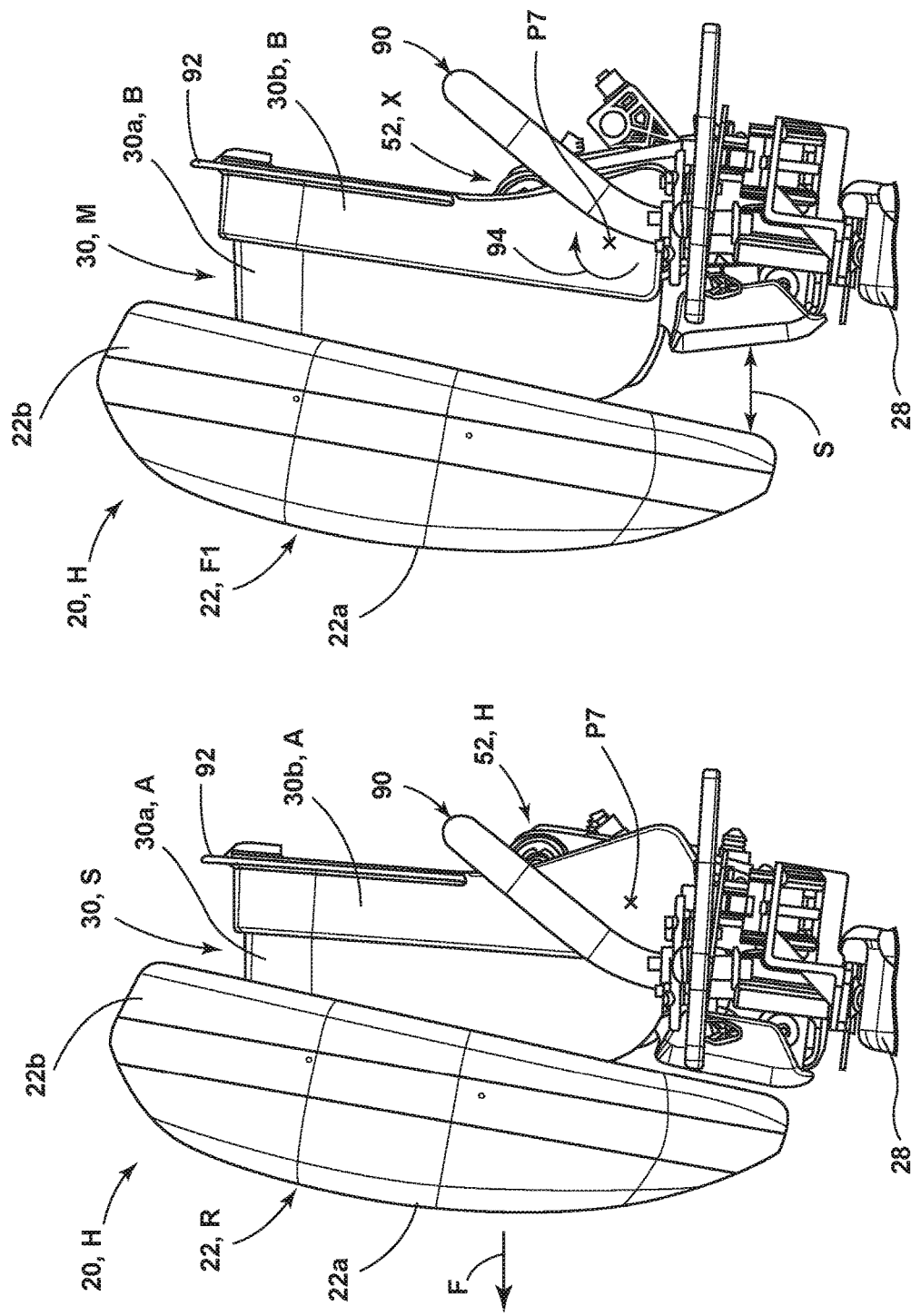
FIG. 5A is a side elevational view of the headrest of FIG. 2A with a shroud removed to reveal the adjustable cover assembly.
FIG. 5B is a side elevational view of the headrest of FIG. 5A with the adjustable cover assembly in a partially extended position.

Referring now to FIG. 5A, the headrest assembly 20 is shown in a home position H with the headrest bun 22 in the retracted position R. The housing 24 has been removed to show the adjustable cover assembly 30 in the stowed position S. As such, the linkage system 52 is contemplated to be in the aft position H best shown in FIG. 4C. With the linkage system 52 in the aft position H, the first member 30a of the adjustable cover assembly 30 is partially received within the second member 30b. With the adjustable cover assembly 30 in the stowed position S, the first member 30a is in its rearward most received position relative to second member 30b. Further, when the adjustable cover 30 is in the stowed position S, the second member 30b is recessed into the housing 24 and fully concealed by the housing 24 as shown in FIG. 2A. As noted above, and further described below with reference to FIG. 12, the first member 30a of the adjustable cover assembly 30 is coupled to the linkage system 52 at an upper portion of mounting plate 42. The second member 30b of the adjustable cover assembly 30 is pivotally coupled to first member 30a, as further described below with reference to FIGS. 12 and 13A. As coupled together, the first member 30a is moveably associated with second member 30b, in that when the first member 30a moves with the linkage system 52, to which the first member 30a is coupled, the second member 30b will also move.

Referring now to FIG. 5B, the adjustable cover assembly 30 is in a mid-position M, wherein it is contemplated that the linkage system 52 has moved from the aft position H shown in FIG. 5A, to a forward position X shown in FIG. 5B. In the forward position X shown in FIG. 5B, the linkage system 52 has driven the headrest bun 22 to a forward position F1. In driving the headrest bun 22 to the forward position F1, the linkage system 52 has carried the first member 30a and second member 30b of the adjustable cover assembly 30 in a forward direction as best indicated relative to support structure 90 shown in FIG. 5B. Thus, as compared to FIG. 5A, wherein the second member 30b of the adjustable cover assembly 30 is in a first position A, the second member 30b of the adjustable cover assembly 30 is now in a second position B as shown in FIG. 5B. Similarly, the first member 30a is shown in a first position A in FIG. 5A, and is now shown in a second position B in FIG. 5B. In position B, the first member 30a is extended outward from a partially nested position within the second member 30b. Further, with the second member 30b in position B, the second member 30b is considered to be partially extending outward from the housing 24 in a manner as shown in FIG. 2B.

As shown in FIGS. 5A and 5B, the second member 30b includes an outwardly extending engagement flange 92 disposed around side and top portions of the second member 30b. In assembly, the outwardly extending engagement flange 92 of the second member 30b is configured to engage an interior rim portion of the housing 24 at front shroud 24a as best shown in FIG. 5F. With the adjustable cover assembly 30 in the mid-position M, it is contemplated that the engagement flange 92 of the second member 30b will be in contact with the interior rim of the front shroud 24a of the housing 24. Contact between the front shroud 24a and the engagement flange 92 will close out any gaps into the housing 24 and cause the second member 30b of the adjustable cover assembly 30 to pivot in a direction as indicated by arrow 94 at pivot point P7. Pivot point P7 represents a pivoted coupling between the first member 30a and the second member 30b of the adjustable cover assembly 30, as further described below.

Figures 5C, 5D:
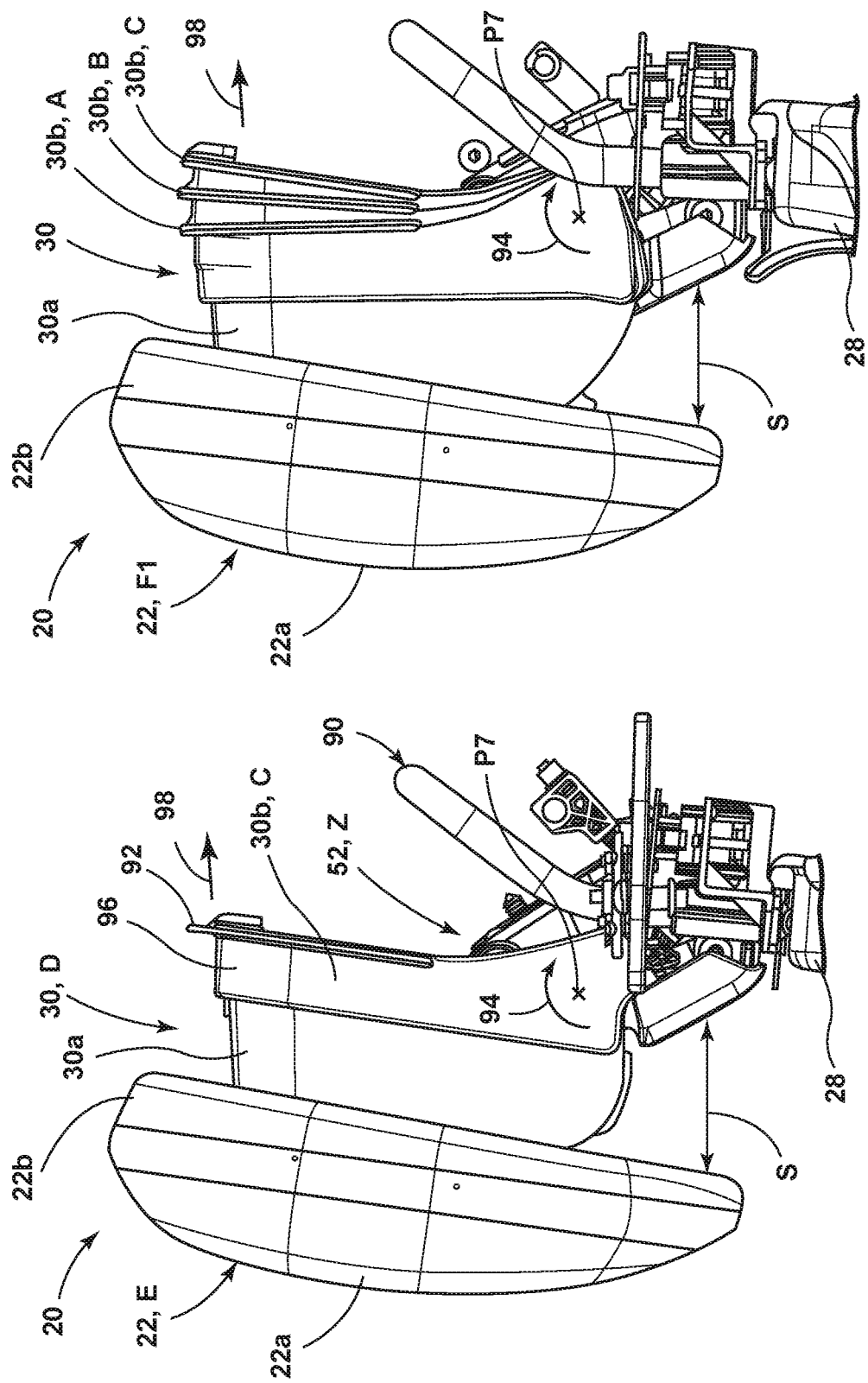
FIG. 5C is a side elevational view of the headrest assembly of FIG. 5B with the adjustable cover assembly in a fully extended position.
FIG. 5D is a side elevational view of the headrest assembly of FIG. 5A with a rear portion of the adjustable cover assembly shown in multiple positions superimposed over the other.
Figures 5E, 5F:
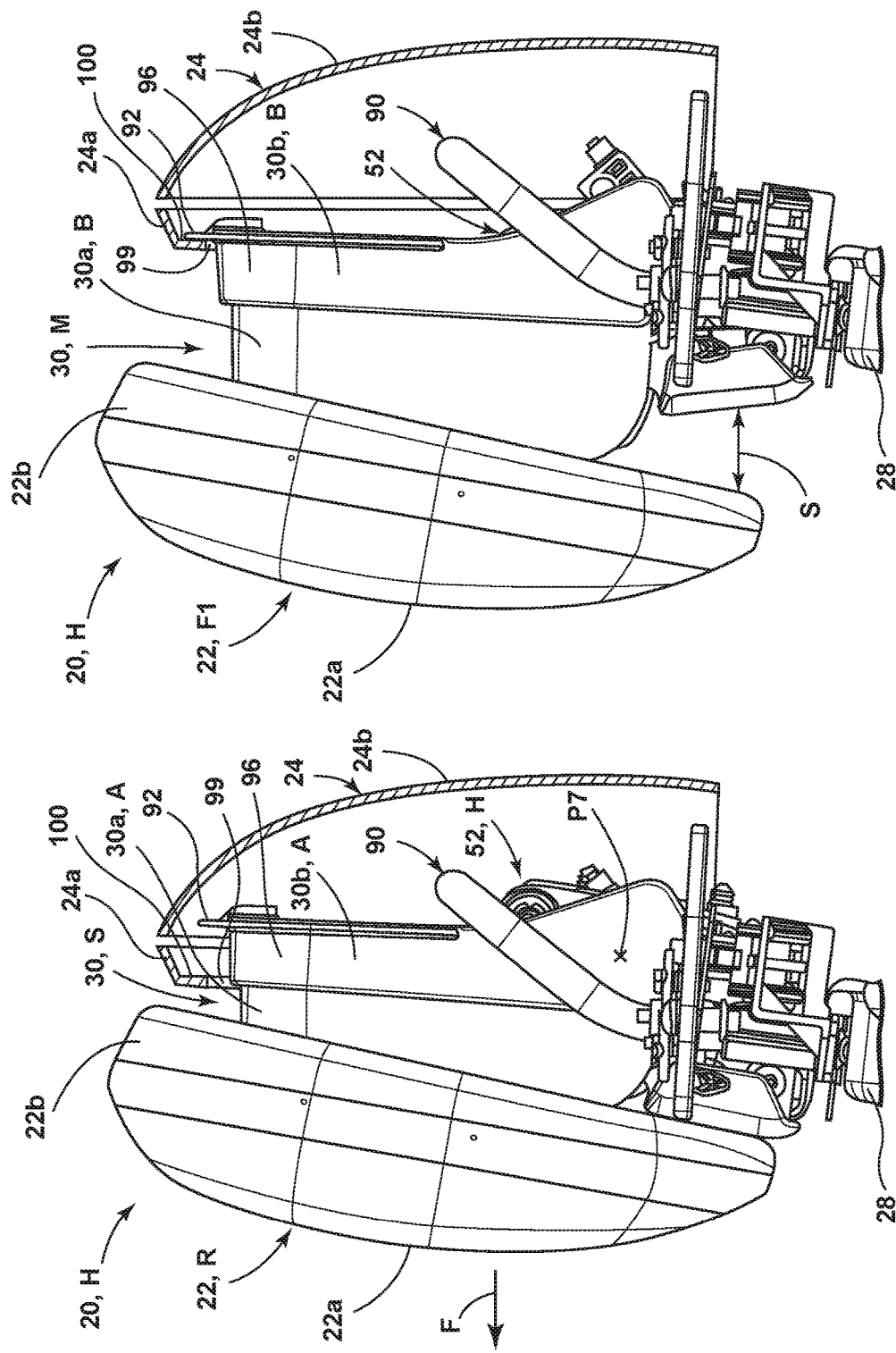
FIG. 5E is a cross-sectional view of the headrest assembly of FIG. 2A showing an engagement flange spaced away from an interior rim of the housing.
FIG. 5F is a cross-sectional view of the headrest assembly of FIG. 2B showing the engagement flange abutting the interior rim of the housing.

Referring now to FIG. 5C, the adjustable cover assembly 30 is shown in the fully deployed position D with the headrest bun 22 in the fully extended position E. In the position shown in FIG. 5C, it is contemplated that the linkage system 52 is in the fore position Z shown in FIG. 4D. With the linkage system 52 driving the headrest bun 22 to the fully extended position E, the engagement flange 92 is contemplated to have retained the upper portion of the second member 30b against the interior rim portion of the front shroud 24a of the housing 24 to pivot the second member 30b from position B (FIG. 5B) to a rearwardly tilted position C shown in FIG. 5C. Again, the pivoting of the second member 30b of the adjustable cover assembly 30 occurs at pivot point P7. Thus, the upper portion 96 of the second member 30b moves rearwardly in a path as indicated by arrow 98 as the second member 30b pivots in a direction as indicated by arrow 94 at pivot point P7. Again, this pivoting action occurs when engagement flange 92 engages an interior of the front shroud 24a of the housing 24 as the headrest bun 22 is driven to the extended position E by the linkage system 52.

Referring now to FIG. 5D, multiple positions of the second member 30b of the adjustable cover assembly 30 are shown as positions A, B and C superimposed over one another. Positions A, B and C represent the positions individually shown in FIGS. 5A, 5B and 5C, respectively. FIG. 5D is used to show relative pivoting movement of the second member 30b of the adjustable cover assembly 30 at pivot point P7 along the path as indicated by arrow 94.

Figure 5G:
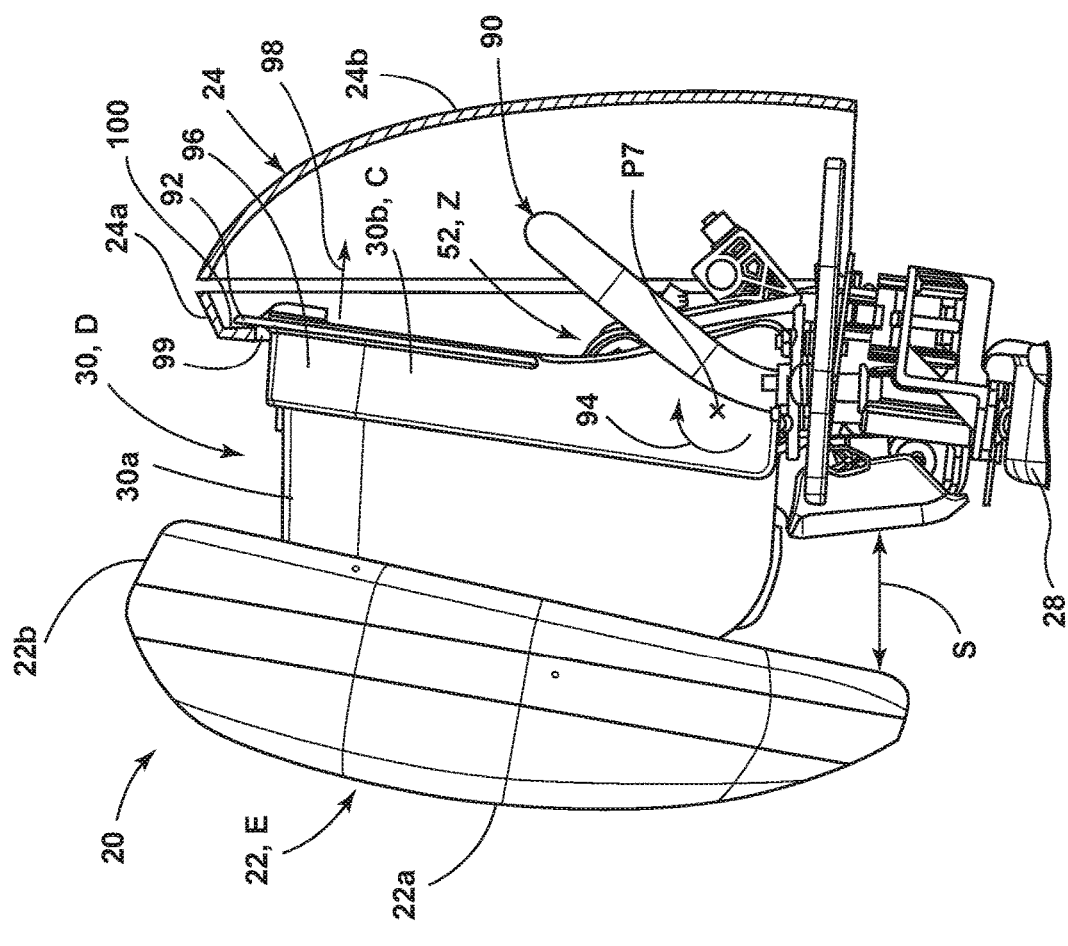
FIG. 5G is a cross-sectional view of the headrest assembly of FIG. 2C showing the engagement flange pivoted relative to the interior rim of the housing.

Referring now to FIGS. 5E, 5F and 5G the front shroud 24a of the housing 24 is shown having an opening 99 through which the adjustable cover assembly 30 outwardly extends. In FIGS. 5E and 5F, the housing 24 is shown in a cross-sectional view to reveal an interior rim portion 100 disposed along the opening 99 of the front shroud 24a. With specific reference to FIG. 5E, the engagement flange 92 of the second member 30b is shown spaced away from the interior rim portion 100 of the front shroud 24a of the housing 24. As the headrest bun 22 moves to the forward position F1 shown in FIG. 5F, the engagement flange 92 of the cover assembly 30 contacts and abuts an interior surface of the interior rim portion 100 of the front shroud 24a of the housing 24. This engagement between the engagement flange 92 of the cover assembly 30 and the interior rim portion 100 of the housing 24 closes out the opening 99 of the front shroud 24a and further causes the second member 30b of the cover assembly 30 to pivot or rotate about pivot point P7 in the direction as indicated by arrow 94. During the pivoting movement of the second member 30b, an upper portion 96 of the second member 30b is tilted rearwardly in a direction as indicated by arrow 98. This pivoting motion continues as the headrest bun 22 is moved to the fully extended position E shown in FIG. 5G.

Referring now to FIGS. 6A and 6B, another embodiment of a vehicle seat 10a is shown having a headrest assembly 20*a* disposed in a home position H. The vehicle seat 10*a* includes a number of features akin to the vehicle seat 10 shown in FIG. 1, for which like reference numerals are included in FIGS. 6A and 6B. Similarly, the headrest assembly 20*a* includes features similar to those found in the headrest assembly 20 shown in FIG. 1. The housing 24*c* of the headrest assembly 20*a* is a more substantial housing as compared to the housing 24 of the headrest assembly 20 of FIG. 1. The housing 24*c* of headrest assembly 20*a* provides a more fluid contour from the headrest assembly 20*a* to the seatback 18 in the embodiment shown in FIGS. 6A and 6B. The headrest bun 22 of vehicle seat 10*a* is contemplated to be an adjustable headrest bun shown in FIGS. 6A and 6B in the home position H. The headrest bun 22 is contemplated to be moved via a linkage system similar to linkage system 52 described above.

Figure 7A:
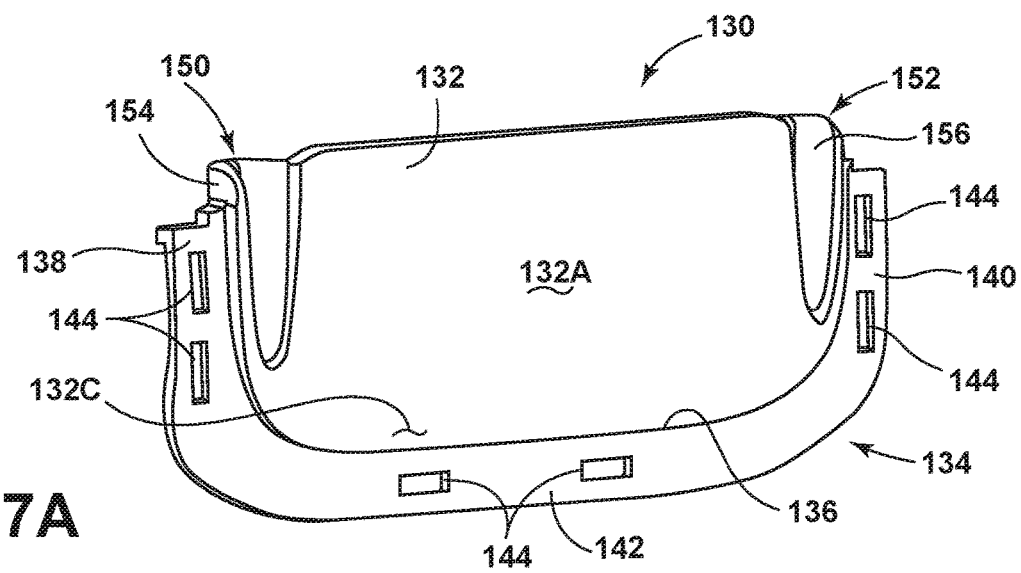
FIG. 7A is a front perspective view of a cover plate.
Figure 7B:
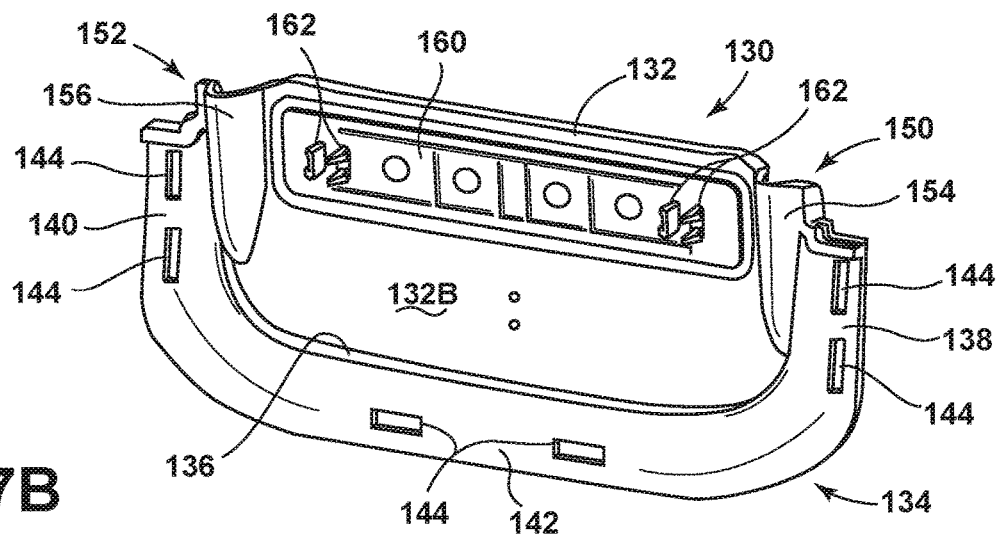
FIG. 7B is a rear perspective view of the cover plate of FIG. 7A.

Referring now to FIG. 7A, a flexible cover member 130 is shown having a plate member 132 that is generally centrally located within a support frame 134. The plate member 132 includes a front side 132A and a rear side 132B (FIG. 7B). The support frame 134 is contemplated to be integrally connected to the plate member 132 having a flexible joint 136 operably disposed therebetween. Having the flexible joint 136, the plate member 132 is operable between extended and retracted positions as further described below with reference to FIGS. 9A and 9B. As further shown in FIGS. 7A and 7B, the support frame 134 includes first and second upright side members 138, 140 which are spaced-apart and interconnected by a lower connecting portion 142. The upright side members 138, 140 upwardly extend from the lower connecting portion 142. Together, the first and second upright side members 138, 140 and the lower portion 142 of the support frame 134 are rigid members defining a generally U-shaped configuration of the support frame 134 in which the plate member 132 is received. The flexible joint 136 is in the form of a living hinge disposed between a lower portion 132C of the plate member 132 and connecting portion 142 of the support frame 134. The flexible cover member 130 is contemplated to be a unitary member as shown in FIGS. 7A and 7B that may be injection molded to include the component parts noted above in a single cover member.

With further reference to FIGS. 7A and 7B, a plurality of mounting slots 144 are disposed around the support frame 134 for connecting the support frame 134 to a vehicle seat as further described below. A pair of flexible connectors 150, 152 are operably coupled to the first and second upright side members 138, 140 of the support frame 134 and further connected to the plate member 132 at opposite sides thereof. The first and second flexible connectors 150, 152 each include retractable portions 154, 156, respectively, which provide sufficient material to allow the plate member 132 to move between extended and retracted positions relative to the support frame 134. The retractable portions 154, 156 shown in the embodiment of FIGS. 7A-7C include inwardly extending bunched material portions that can be stretched or straightened out to accommodate movement of the plate member 132 to the extended position from the retracted position. The flexible connectors 150, 152 are contemplated to be made of a soft polymeric material that is flexibly resilient and integrally molded with the plate member 132 and the support frame 134. Having the flexible connectors 150, 152 disposed on opposite sides of the plate member 132, the plate member 132 can stretch to an extended position as a headrest assembly is horizontally extended, and recover its design position or retracted position as the headrest assembly retracts to the home position. Given the flexibly resilient nature of the retractable portions 154, 156, the plate member 132 will outwardly extend towards the extended position only as far as necessary as driven by the movement of an associated headrest assembly.

With specific reference to FIG. 7B, the rear or inner surface 132B of the plate member 132 is shown having a rigidifying member in the form of a molded-in stiffener 160 disposed thereon. The molded-in stiffener 160 includes a plurality of heat stacking features 162 that help provide structural rigidity to the plate member 132.

Figure 7C:
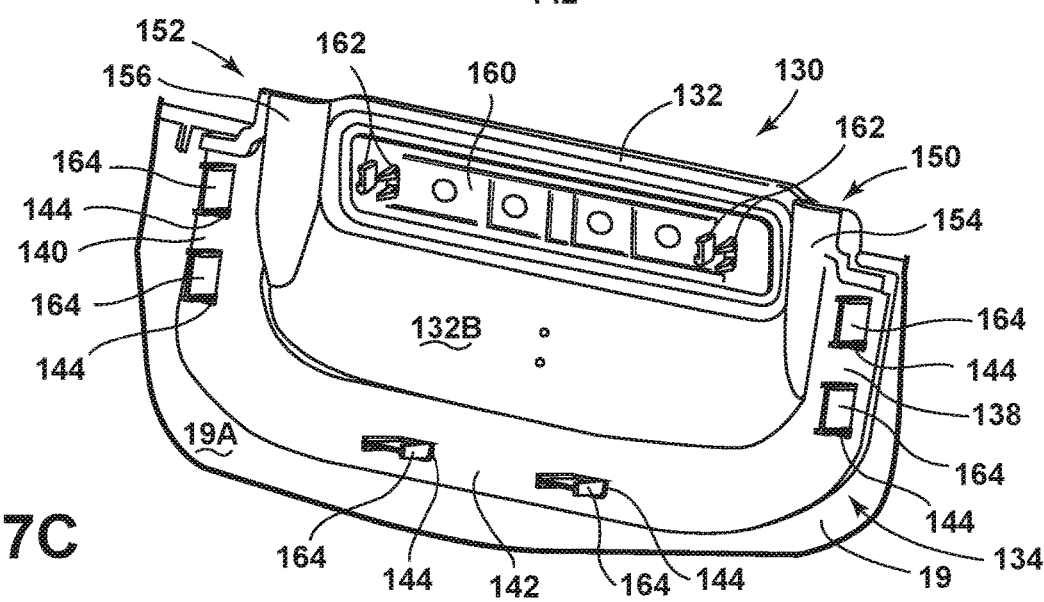
FIG. 7C is a rear perspective view of the cover plate of FIG. 7B as coupled to a frame component of a vehicle seat.

Referring now to FIG. 7C, the flexible cover member 130 is shown coupled to an inner surface 19A of a closeout member 19 that is generally disposed at the upper portion 18*a* of the seatback 18 as shown in FIG. 6A. The closeout member 19 is a trim component of the vehicle seat 10*a* disposed below the adjustable headrest assembly 20*a*. Attachment clips 164 outwardly extend from the inner surface 19A of the closeout member 19 and are received through fastening slots 144 disposed around the support frame 134 of the flexible cover member 130. In this way, the flexible cover member 130 easily attaches to the seat assembly for covering components of a headrest assembly as further described below. The flexible cover member 130 is releasably coupled to the closeout member 19, thereby providing selective access to various components of the headrest assembly for maintenance thereof.

Figure 8B:
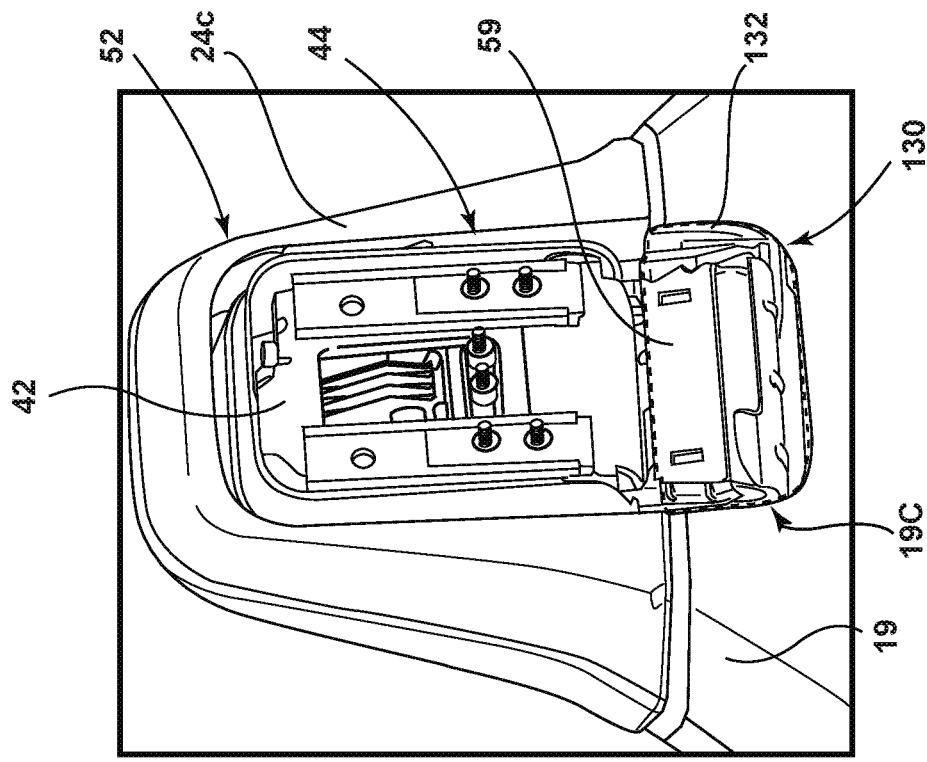
FIG. 8B is a front perspective view of the cover plate of FIG. 8A shown in phantom to reveal various coupling components of the vehicle seat.
Figure 8A:
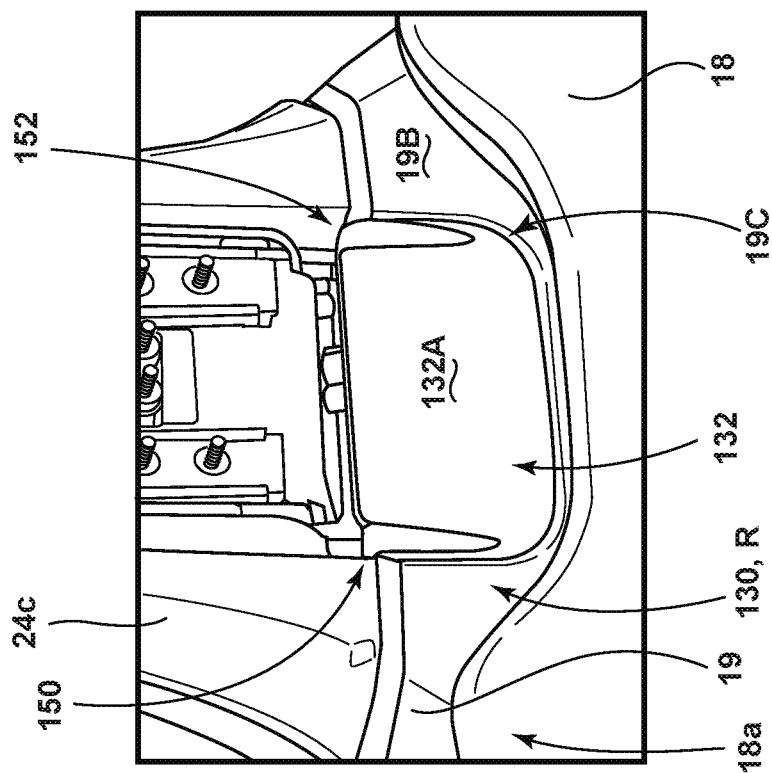
FIG. 8A is a front perspective view of the cover plate of FIG. 7A coupled to the vehicle seat of FIG. 6A.

Referring now to FIG. 8A, the flexible cover member 130 is shown in a retracted position R as coupled to upper portion 18*a* of the seatback 18 at closeout member 19. In the retracted position R, the flexible cover member 130 is in a substantially horizontal position, or more specifically, in a common plane with the seatback 18. Thus, the flexible connectors 150, 152 are in a retracted or at-rest states. As further shown in FIG. 8A, the closeout member 19 includes a relief portion 19C which is configured to receive a portion of the linkage system 52 when the linkage system moves towards the fore position from the aft position. The flexible cover member 130 is coupled to the closeout member 19 at the relief portion 19C to close off the relief portion 19C and conceal the linkage system. With reference to FIG. 8B, the flexible cover member 130 is shown in phantom, such that a lower portion 59 of the linkage system 52 is disposed directly against the rear or inner surface 132B of the plate member 132. The lower portion 59 of the linkage system 52 may be the cross member 58 shown in FIG. 3A as described above. Any other portion of the linkage system 52 may be in contact with the inner surface 132B of the flexible cover member 130 for urging the flexible cover member 130 to an extended position as further described below. It is noted that in FIGS. 8A and 8B, the headrest bun 22 has been removed to reveal the channel and rail arrangement 44 disposed on the mounting plate 42 of the linkage system 52.

Referring now to FIG. 9A, the flexible cover member 130 is shown in the retracted position R, wherein the plate member 132 is substantially horizontal and flexible connector 152 is in an at-rest position against the linkage system 52. Flexible connector 150 is not shown in FIGS. 9A and 9B, but presumed to function in a similar manner as flexible connector 152. In the embodiment shown in FIG. 9A, the linkage system 52 is contemplated to be in a home position H, such that the headrest bun 22 is in a retracted position R. Thus, in the configuration shown in FIG. 9A, the linkage system 52 is akin to the position of the linkage system 52 shown in FIGS. 3A, 4A and 4C. In FIG. 9B, the linkage system 52 has translated outwardly to move the headrest bun 22 to a forward position F1, such that the linkage system 52 is in a forward position Y as further discussed above and also referenced in FIG. 3C. In FIG. 3C, the spacing S is shown between the cross member 58 of the first link 54. In the embodiment shown in FIG. 9B, the cross member 58 may comprise a part of the lower portion 59 (FIG. 8B) of the linkage system 52 that is configured to contact and urge the flexible cover member 130 to the extended position E shown in FIG. 9B. In the extended position E, the flexible cover member 130 has the flexible connector 152 extended outwardly, such that the retractable portion 156 of the flexible connector 152 is pulled or stretched as the inner surface 132B of the flexible cover member 130 is acted on by the lower portion 59 of the linkage system 52. As the linkage system 52 returns from position Y (FIG. 9B) to the home or aft position H (FIG. 9A), it is contemplated that the retractable portion 156 of the flexible connector 152 will retract towards the at-rest position to bring the flexible cover member 130 back to the retracted position R. Thus, the flexible connectors 150, 152 are operable between stretched and at-rest positions. The flexible connector s 150, 152, and particularly the retractable portions 154, 156 thereof, are resilient members that are biased towards the at-rest position. Due to this arrangement, the flexible cover member 130 is urged or biased towards the retracted position R by the flexible connectors 150, 152, such that the flexible cover member 130 remains in continued contact with the linkage system 52 when the linkage system 52 begins to act on the inner surface 132B of the plate member 132 by abutting the inner surface 132B to move the plate member 132 to the extended position E (FIG. 9B) from the retracted position R (FIG. 9A). In the embodiments shown in FIGS. 9A and 9B, the retractable portion 156 appears in an accordion-style configuration, however, it is contemplated that a more smooth or continuous portion of flexible elastic material may be used as shown in FIGS. 7A-7C.

Referring now to FIG. 10A, the headrest assembly 20 is shown with the headrest bun 22 in the extended position E, which correlates to the adjustable cover assembly 30 being in the deployed position D. Thus, the headrest bun 22 is extended outwardly from the housing 24 as driven by the linkage system 52 shown in FIG. 10B. In FIG. 10B, the headrest bun 22 has been removed to reveal the mounting plate 42 to which the headrest bun 22 is operably coupled. As noted above, the mounting plate 42 is a front part of the linkage system 52. In FIG. 10B, the linkage system 52 is in the full fore position Z. In FIG. 10A, the linkage system 52 is substantially concealed by a combination of the adjustable cover assembly 30 and the housing 24. When the linkage system 52 is in the aft position or home position H, the linkage system 52 is substantially concealed by the housing 24 and only partially concealed by the adjustable cover assembly 30 as shown in FIG. 2A.

As noted above, the adjustable cover assembly 30 includes first and second members 30a, 30b, wherein first member 30a is an inner member relative to second member 30b, which is an outer member. First member 30a is generally telescopingly received in the outer second member 30b when the adjustable cover assembly 30 is in the stowed position S (FIG. 2A). As the linkage system 52 drives the headrest bun 22 outwardly to the extended position E, the first member 30a of the adjustable cover assembly 30 is also driven outwardly from a substantially concealed position within the housing 24 and a nested position within second member 30b. This is due to the fact that the first member 30a is fixedly coupled to the linkage system 52, as further described below. As shown in FIG. 10B, a gap G exists between the first member 30a and the second member 30b. The gap G disposed between the first and second members 30a, 30b is provided to present an aesthetically pleasing adjustable cover assembly 30, wherein the telescoping motion of the first and second members 30a, 30b and the pivoting motion of the second member 30b is a smooth and continuous appearing motion. The gap G between the first member 30a and the second member 30b adds to the overall aesthetic of the adjustable cover assembly 30 and is maintained during movement of the adjustable cover assembly 30 from the stowed position S to the deployed position D, as further described below.

Figure 11A:
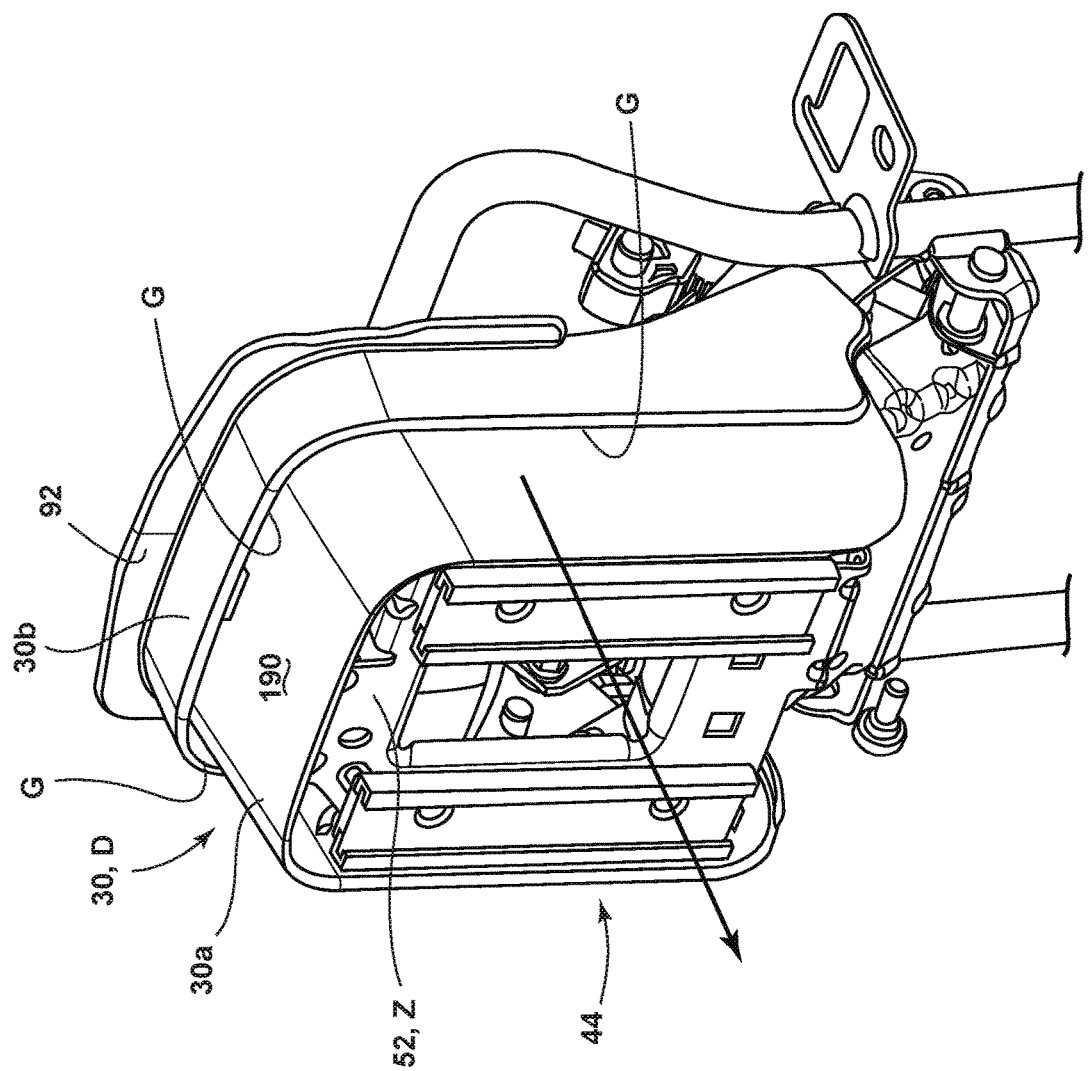
FIG. 11A is a front perspective view of the headrest assembly of FIG. 10B with a rear housing removed.

Turning now to FIG. 11A, the housing 24 has been removed and the adjustable cover assembly 30 is shown in the deployed position D, such that the linkage system 52 is also in the Z position which correlates to a forward-most position of the linkage system 52. The gap G is shown disposed between the first member 30a and second member 30b of the adjustable cover assembly 30 in FIG. 11A at an outer surface 190 of the first member 30a. The gap G defines a clearing distance or spacing between the first and second members 30a, 30b to allow for independent movement of the first and second members 30a, 30b. In FIG. 11A, the pivot point P7 is shown as defining a pivot access between the first and second members 30a, 30b for rotation of the second member 30b in the direction as indicated by arrow 94.

Figure 11B:
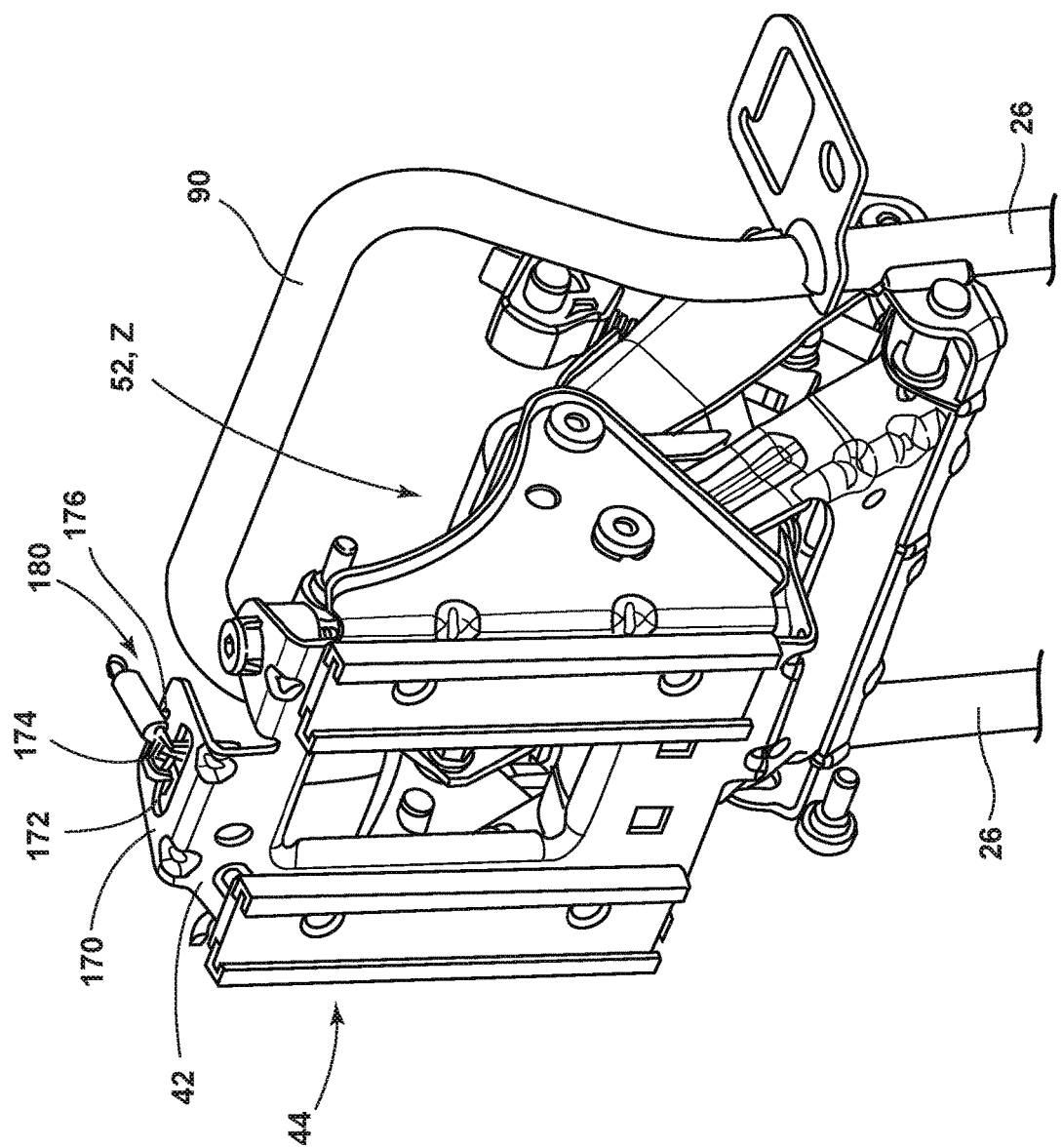
FIG. 11B is a front perspective view of the headrest assembly of FIG. 11A with the adjustable cover assembly removed to reveal the linkage system.

Referring now to FIG. 11B, the adjustable cover assembly 30 has been removed to reveal the linkage system 52 in the fore position Z. The mounting plate 42 of the linkage system 52 further includes an upper landing 170 having an oblong shaped slot 172 with a clip member 174 disposed therein. The upper landing portion 170 of the mounting plate 42 provides a connecting location for the first member 30a of the adjustable cover assembly 30. As further shown in FIG. 11B, a biasing mechanism 180, in the form of a spring, is shown coupled to a mounting aperture 176 disposed at a rear portion of the upper landing 170. The biasing mechanism 180 is contemplated to couple to an inner surface of the second member 30b of the adjustable cover assembly 30 for biasing the second member 30b of the adjustable cover assembly 30 towards an extended position as the mounting plate 42 is driven outwardly by the linkage system 52.

Figure 12:
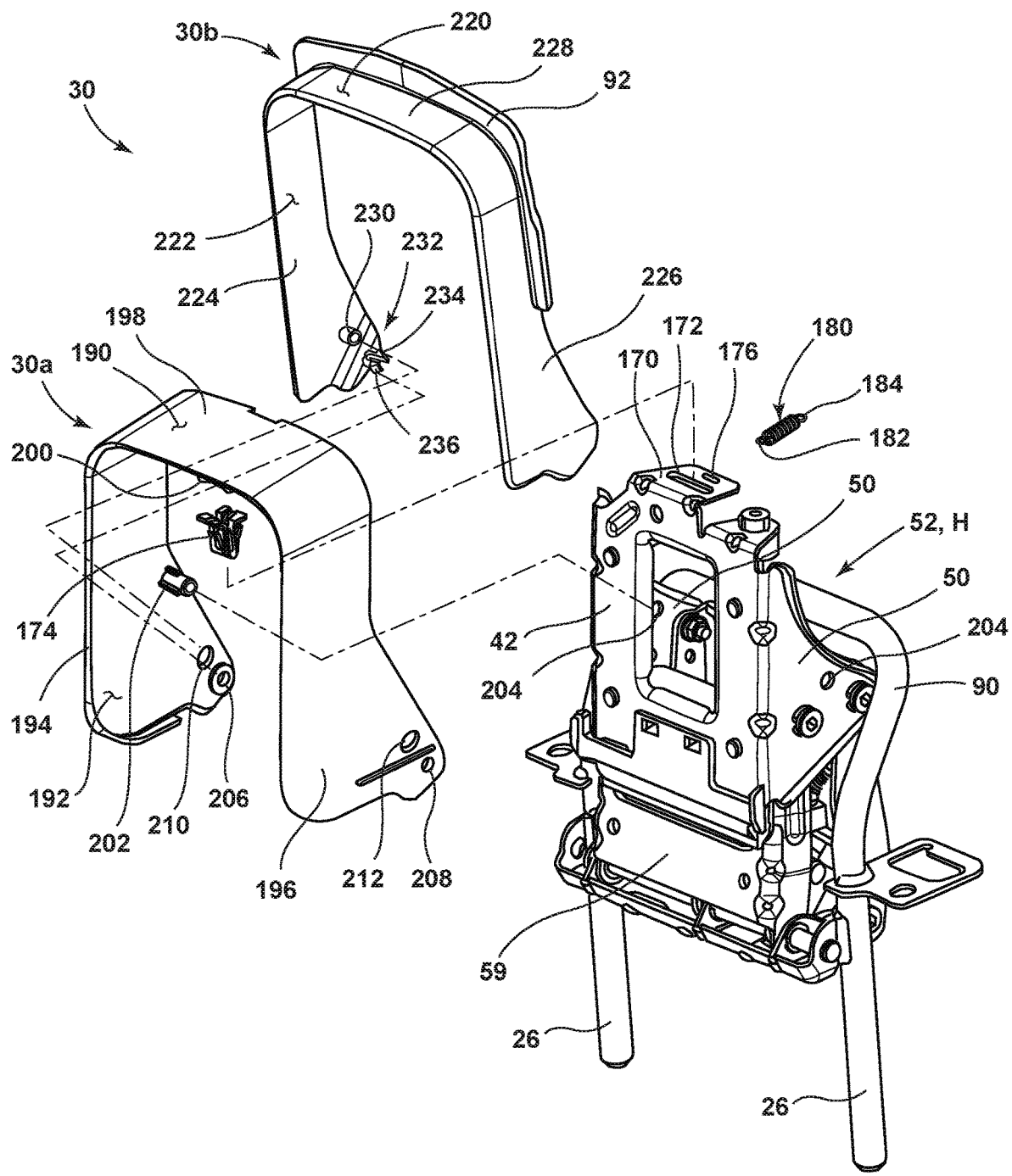
FIG. 12 is a front perspective view of a headrest assembly shown in a retracted position with components of the adjustable cover assembly exploded away from the linkage system.
Figure 13A:
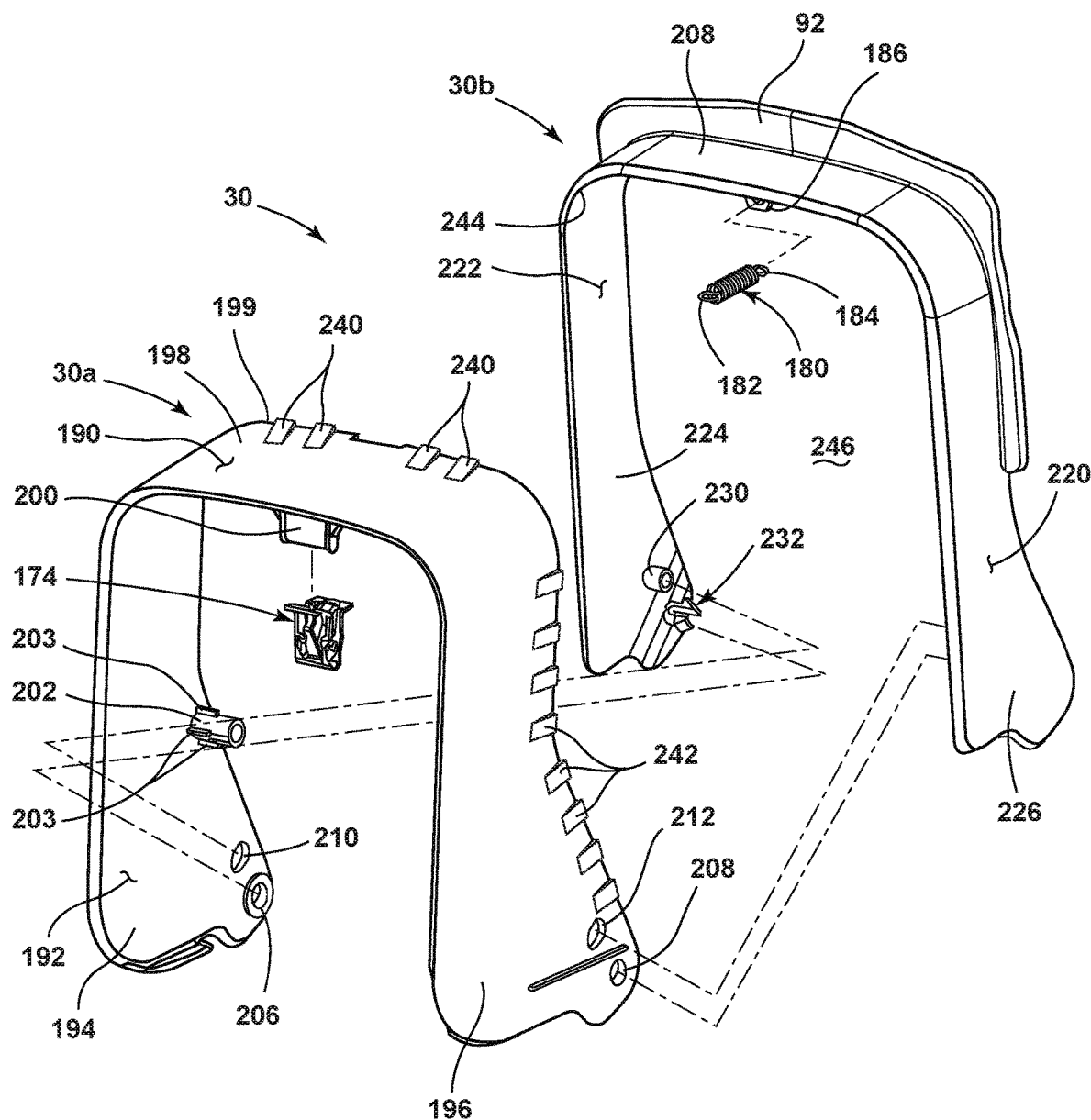
FIG. 13A is a front perspective view of components of another embodiment of an adjustable cover assembly exploded away from one another.

Referring now to FIG. 12, the first and second members 30a, 30b of the adjustable cover assembly 30 are shown exploded away from the linkage system 52. In FIG. 12 the linkage system 52 is shown in the aft position or home position H. As further shown in FIG. 12, the biasing mechanism 180 includes a first end 182 and a second end 184. The first end 182 is configured to couple to the mounting aperture 176 on the upper landing portion 170 of the mounting plate 42. The second end 184 is configured to couple to a mounting tab 186 of the second member 30b as best shown in FIG. 13A. As further shown in FIG. 12, the first member 30a includes a generally inverted U-shaped configuration having an outer surface 190 and an inner surface 192. The inverted U-shaped configuration of the first member 30a is defined by first and second side portions 194, 196 which are interconnected by a top portion 198. The top portion 198 includes a downwardly extending mounting tab 200 disposed on the inner surface 192 of the top portion 198. The mounting tab 200 is configured to receive the clip member 174 for clipping the first member 30a to the upper landing portion 170 of the linkage system 52. The first and second side portions 194, 196 further include inwardly extending mounting bosses 202. In FIG. 12, mounting boss 202 disposed on side portion 194 is shown, while a similar mounting boss is contemplated to be disposed on the second side portion 196 at an inner surface 192 thereof. The mounting bosses 202 of the first member 30a are contemplated to be received in mounting apertures 204 disposed on the rearwardly extending brackets 50 of the mounting plate 42 of the linkage system 52. Thus, in the embodiment shown in FIG. 11A, the first member 30a is contemplated to be fixedly coupled to the linkage system 52 via the connection between the mounting tab 200 and clip member 174 with oblong slot 172 of the upper landing portion 170 of the mounting plate 42, and further by the connection of the mounting bosses 202 with the mounting apertures 204 of the rearwardly extending brackets 50. The lower rear portions of the first and second side members 194, 196 include pivot apertures 206, 208 for pivotally coupling the second member 30b to the first member 30a. Guide slots 210, 212 are elongate slots that are disposed above the pivoting apertures 206, 208 as shown in FIG. 12. The guide slots 210, 212 are configured to receive guide members disposed on the second member 30b, as further described below.

As further shown in FIG. 12, the second member 30b also includes a generally inverted U-shaped configuration with an outer surface 220 and an inner surface 222. The inverted U-shaped configuration of the second member 30b is defined by first and second side portions 224, 226 which are interconnected by a top portion 228. A rearmost edge of the top portion 228 includes the outwardly extending engagement flange 92 which extends from the outer surface 220 of the second member 30b along the top portion 228 and the first and second side portions 224, 226. As noted above, the engagement flange 92 is configured to abut a portion of the housing of the headrest assembly for pivoting movement of the second member 30b as the headrest bun extends forward. The second member 30b further includes guide members 230 which are configured to be received in the guide slots 210, 212 of the first member 30a. In FIG. 12, guide member 230 is disposed on the inner surface 222 of the first side portion 224 and extends inwardly. It is contemplated that the second side portion 226 also includes a guide member such as guide member 230 for coupling to guide slot 212 of the first member 30a. Disposed below the guide member 230, a pivot member 232 inwardly extends. It is further contemplated that side portion 226 also includes a pivot member 232. The pivot members 232 of the second member 30b are contemplated to be received in the pivot apertures 206, 208 of the first member 30a to define the pivot axis at pivot point P7 between the first and second members 30a, 30b as shown in FIG. 11A. In the embodiment shown in FIG. 12, the pivot member 232 is shown in the form of a clip having spaced-apart engagement features 234, 236 which are flexibly resilient for fitting into the pivot apertures 206, 208 of the first member 30a. Once received therein, the engagement features 234, 236 retain the second member 30b in a pivoting engagement with the first member 30a. With the guide members 230 disposed in the guide slots 210, 212, the pivoting motion of the second member 30b relative to the first member 30a is limited by the length of the guide slots 210, 212, which are contemplated to be relatively short slots for restricting pivoting movement of the second member 30b.

As noted above, the first and second members 30a, 30b of the adjustable cover assembly 30 are polymeric parts, such that the side portions 194, 196 and 224, 226, respectively, can be spread-apart for properly mounting the first and second members 30a, 30b. With specific reference to the first member 30a, the first and second side portions 194, 196 can be spread outwardly, such that the first member 30a can fit over the top of the linkage system 52 and provide clearance for the mounting bosses 202 with respect to the rearwardly extending brackets 50 of the mounting plate 42. In mounting the first member 30a, the mounting bosses 202 will be received in the mounting apertures 204 of the rearwardly extending brackets 50 disposed on opposite sides of the linkage system 52. The first and second side portions 194, 196 will resiliently return to their at-rest position shown in FIG. 12 to connect the first member 30a with the linkage system 52 when the mounting bosses 202 are aligned with and received in the mounting apertures 204. Further, downward movement of the first member 30a onto the linkage system 52 will correlate to the coupling of the first member 30a with the oblong aperture 172 of the upper landing portion 170 of the mounting plate 42. In this way, the first member 30a of the adjustable cover assembly 30 is fixedly coupled to the linkage system 52.

With further reference to FIG. 12, the second member 30b of the adjustable cover assembly 30 includes flexibly resilient side portions 224, 226. These side portions 224, 226 can be spread-apart to provide clearance for mounting the second member 30b on the first member 30a. Specifically, sufficient clearance is necessary in order to provide room for the guide member 230 and the pivot member 232 inwardly extending from both the first and second side portions 224, 226. With the flexibly resilient first and second side portions 224, 226 spread apart from one another, clearance is provided to couple the pivot member 232 with the pivot apertures 206, 208 of the first member 30a. Further, the guide members 230 will be received in the guide slots 210, 212 of the first member 30a as the second member 30b is positioned over the first member 30a. Once properly aligned, the guide members 230 and pivot members 232 will be received within the guide slots 210, 212 and pivot apertures 206, 208, respectively, and the flexibly resilient nature of the first and second side portions 224, 226 of the second member 30b will return to their at-rest position shown in FIG. 12 from an outwardly flexed mounting position.

Referring now to FIG. 13A, the first and second members 30a, 30b of the adjustable cover assembly 30 are shown exploded away from one another in a similar manner to that shown in FIG. 12. As noted above, the inverted U-shaped configuration of the second member 30b is defined by first and second side portions 224, 226 which are interconnected by a top portion 228 to further define an interior 246 of the second member 30b in which the first member 30a can partially nest. In the embodiment shown in FIG. 13A, the mounting tab 200 of the first member 30a is clearly shown for receiving clip member 174. Again, the mounting tab 200 and clip member 174 are used to fixedly couple the first member 30a to the linkage system 52 at mounting plate 42. As further shown in FIG. 13A, the biasing mechanism 180 is configured to couple to mounting tab 186 extending downwardly from the top portion 228 of the second member 30b.

As further shown in FIG. 13A, the mounting boss 202 includes a number of standoff features 203 disposed therearound for spacing the inner surface 192 of the first member 30a away from the rearwardly extending brackets 50 of the linkage system 52. Disposed along a rear edge 199 of the first member 30a, a plurality of spacers 240, 242 are disposed along the top portion 198 and first and second side portions 194, 196, respectively. The spacers 240, 242 are inclined or wedged members which are configured to engage an interior rim portion 244 of the second member 30b as the first member 30a is moved forward by the linkage system 52. The spacers 240, 242 are configured to engage the interior rim portion 244 of the second member 30b to maintain a gap G disposed between the first and second members 30a, 30b as described above with reference to FIG. 10B and FIG. 11B. The engagement of the spacers 240, 242 of the first member 30a to the second member 30b is further described below with reference to FIGS. 13B and 13C.

Figure 13B:
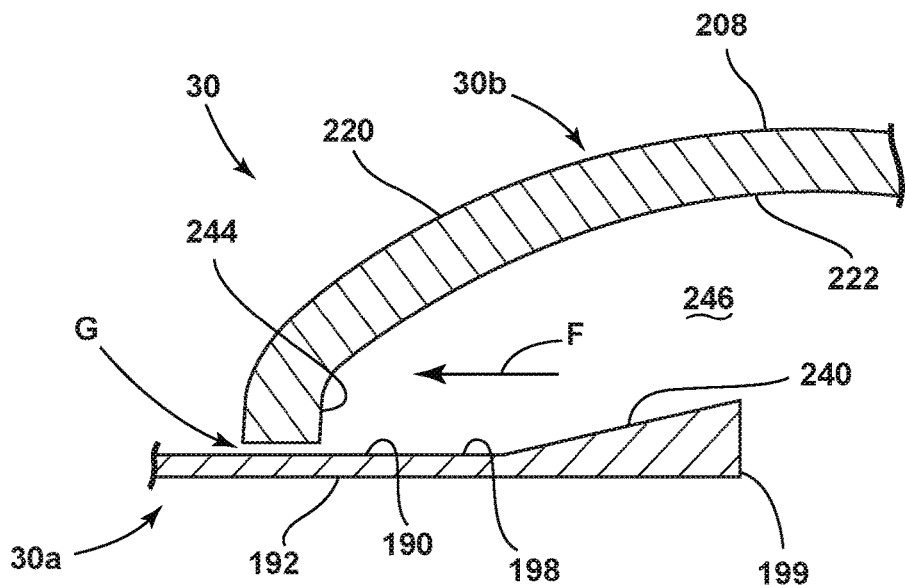
FIG. 13B is a cross-sectional view of the cover assembly components of FIG. 13A in an assembled condition showing a spacer of the first member of the cover assembly spaced-apart from a front engagement edge of a second member of the cover assembly.

Referring now to FIG. 13B, a cross-sectional view of the adjustable cover assembly 30 is shown with the first member 30a partially nested within an interior 246 of the second member 30b. The gap G is shown disposed between the upper or outer surface 190 of the first member 30a and the inner surface 222 of the second member 30b. In FIG. 13B, the spacer 240 disposed on the top portion 198 of the first member 30a is positioned away from the interior rim portion 244 of the second member 30b. As the linkage system 52 drives the first member 30a in a forward direction as indicated by arrow F, the spacer 240 approaches the interior rim portion 244 of the second member 30b.

Figure 13C:
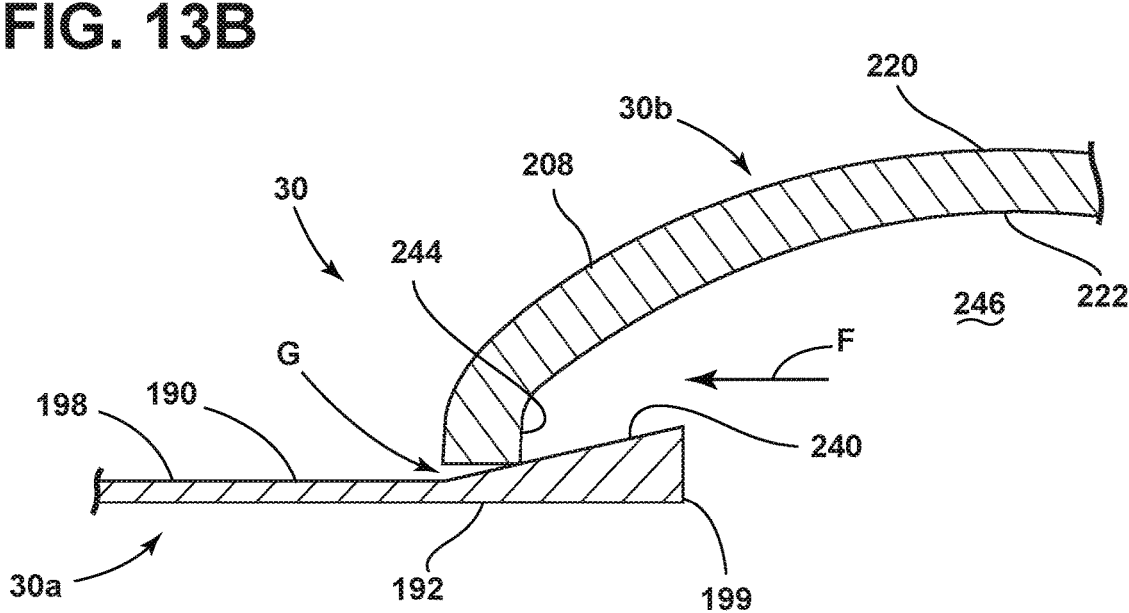
FIG. 13C is a cross-sectional view of the cover assembly components of FIG. 13B showing the engagement edge of the second member positioned in contact with the spacer of the first member.

Referring now to FIG. 13C, the interior rim portion 244 of the second member 30b is now in contact with the spacer 240 of the first member 30a for engagement therewith. The engagement of the spacer 240 with the interior rim portion 244 of the second member 30b causes the second member 30b to move in a forward direction as indicated by arrow F along with and carried by the movement of the first member 30a. As noted above, when the first member 30a begins to move the second member 30b from a concealed position within the housing 24 of the headrest assembly 20, the upwardly extending engagement flange 92 of the second member 30b will move towards engagement with the interior rim portion 100 of the housing 24 as best shown in FIGS. 5E, 5F and 5G for pivoting the upper portion 96 of the second member 30b relative to the first member 30a. Again, the pivoting movement of the second member 30b relative to the first member 30a is a rearwardly pivoting movement at pivot point P7 best shown in FIG. 5G.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seat, comprising:
   a seatback having a seatback frame and an upper portion;
   a headrest assembly having an adjustable headrest bun that is operable between extended and retracted positions relative to a support structure, wherein the support structure is operably coupled to the seatback frame, and further wherein the adjustable headrest bun is supported above the upper portion of the seatback by the support structure;
   an actuator operably coupled to the support structure and the adjustable headrest bun for driving the adjustable headrest bun between the extended and retracted positions; and
   a cover member positioned below the headrest assembly comprising a generally U-shaped support frame and a plate member pivotally coupled to a lower portion of the support frame through a flexible joint, wherein ends of the plate member are coupled to side members of the support frame through flexible connectors.

2. The vehicle seat of claim 1, wherein the flexible connectors extend from the flexible joint to distal ends of the side members.

3. The vehicle seat of claim 1, wherein the flexible connectors are operable between at-rest and stretched conditions.

4. The vehicle seat of claim 3, wherein the flexible connectors are resilient members biased towards the at-rest condition.

5. The vehicle seat of claim 3, wherein the plate member is in a retracted position when the flexible connectors are in the at-rest condition.

6. The vehicle seat of claim 1, further comprising:
   a rigidifying member disposed on an inner surface of the plate member.

7. The vehicle seat of claim 1, further comprising:
   a plurality of mounting slots disposed on the support frame.

* * * * *